(12) United States Patent
Usami et al.

(10) Patent No.: US 8,554,186 B2
(45) Date of Patent: Oct. 8, 2013

(54) MOBILE TERMINAL DEVICE, COMPUTER EXECUTABLE PROGRAM FOR EXCHANGING PERSONAL INFORMATION, AND METHOD AND SYSTEM FOR EXCHANGING PERSONAL INFORMATION

(75) Inventors: Takayuki Usami, Tokyo (JP); Mitsuhiro Nishibe, Tokyo (JP); Shunsuke Kunieda, Tokyo (JP); Kazunori Ueda, Kanagawa (JP); Takashi Kawakami, Tokyo (JP); Makoto Kawamura, Kanagawa (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 438 days.

(21) Appl. No.: 12/335,046

(22) Filed: Dec. 15, 2008

(65) Prior Publication Data
US 2009/0186603 A1 Jul. 23, 2009

(30) Foreign Application Priority Data

Dec. 17, 2007 (JP) ................................ 2007-325233

(51) Int. Cl.
*H04M 3/493* (2006.01)
*H04B 7/00* (2006.01)

(52) U.S. Cl.
USPC ..................................... 455/414.2; 455/41.2

(58) Field of Classification Search
USPC ............... 455/41.2, 456.5, 456.3, 456.6, 406, 455/407, 408, 466, 566, 414.1, 412.2, 414.2, 455/414.3; 707/781, 784, 783; 709/204, 709/206, 218, 227, 229; 379/88.11, 92.23
See application file for complete search history.

(56) References Cited

U.S. PATENT DOCUMENTS

| | | | | |
|---|---|---|---|---|
| 6,889,212 B1 * | 5/2005 | Wang et al. | | 705/59 |
| 7,310,676 B2 * | 12/2007 | Bourne | | 709/227 |
| 7,511,603 B2 * | 3/2009 | Hellebust et al. | | 340/7.5 |
| 7,725,492 B2 * | 5/2010 | Sittig et al. | | 707/784 |
| 2004/0046656 A1 | 3/2004 | Schaefer et al. | | |
| 2005/0191963 A1 * | 9/2005 | Hymes | | 455/41.2 |
| 2006/0085419 A1 * | 4/2006 | Rosen | | 707/9 |
| 2006/0294134 A1 * | 12/2006 | Berkhim et al. | | 707/102 |
| 2008/0242322 A1 * | 10/2008 | Scott et al. | | 455/466 |
| 2009/0110177 A1 * | 4/2009 | Sivakumar | | 379/218.01 |

FOREIGN PATENT DOCUMENTS

| | | |
|---|---|---|
| GB | 2 389 742 | 12/2003 |
| JP | 11 8874 | 1/1999 |
| JP | 2001 333451 | 11/2001 |
| JP | 2002 58069 | 2/2002 |
| WO | WO 02 25986 | 3/2002 |

* cited by examiner

Primary Examiner — George Eng
Assistant Examiner — Hung Du
(74) Attorney, Agent, or Firm — Frommer Lawrence & Haug LLP; William S. Frommer; Paul A. Levy

(57) ABSTRACT

A mobile terminal device that has a short range wireless communications unit performing short range wireless communications. A personal information storage unit storing a set of simple personal information relevant to the user of the mobile terminal device and a set of contact information for the user attached to the set of simple personal information and inhibited from being displayed on a device receiving this information.

6 Claims, 16 Drawing Sheets

MOBILE TERMINAL DEVICE, COMPUTER EXECUTABLE PROGRAM FOR EXCHANGING PERSONAL INFORMATION, AND METHOD AND SYSTEM FOR EXCHANGING PERSONAL INFORMATION

CROSS REFERENCE TO RELATED APPLICATIONS

The present invention contains subject matter related to Japanese Patent Application JP 2007-325233 filed in the Japanese Patent Office on Dec. 17, 2007, the entire contents of which being incorporated herein by reference.

BACKGROUND OF THE INVENTION (1) Field of the Invention

The present invention relates to a mobile terminal device, a computer executable program for exchanging personal information, a method for exchanging personal information, and a system for exchanging personal information, enabling exchanging personal information in a level-wise fashion, suitably applicable to mobile devices such as mobile phones, personal handyphone systems (PHS), personal digital assistants (PDA), handheld gaming devices, notebook personal computers having a short range wireless communications function such as, e.g., infrared communication, Bluetooth™, wireless local area network (LAN), or non-contact IC card and a wireless communications function for performing wireless communications via a wireless base station. Particularly, the invention relates to a mobile terminal device, a computer executable program for exchanging personal information, and a method and system for exchanging personal information, whereby respective sets of personal information for respective peer users exchanged for a predetermined period of time are automatically grouped and registered, so that a member of the group with which personal information was exchanged can easily be identified later.

(2) Description of the Related Art

JP-A No. 2001-333451 (pp. 4-5, FIG. 1 and FIG. 8) discloses a system for communication services between terminals in which checking peer's information and transferring personal information in a level-wise fashion are carried out by means of short range wireless communications combined with wide area network wireless communications.

In this system for communication services between terminals, when a first mobile terminal and a second mobile terminal are located within a given range with respect to each other, these mobile terminals exchange mutual access codes and access passwords together with minimum necessary information such as user's sexuality, age, and conditions, transparently to the users of the terminals, through their short range wireless communications units.

Then, if the user of the first mobile terminal which exchanged, as above, minimum necessary information with the second mobile terminal wants to know detailed personal information about the user of the second mobile terminal, the first terminal user transmits the access code and access password received from the second mobile terminal during the above exchange, together with the user ID and password of the first mobile terminal to a server, through a wide area network communications unit. The server performs user authentication based on the user ID and password received from the first mobile terminal. If the first terminal user is authenticated as a valid user, the server sends the second mobile terminal a message asking if the user of the second mobile terminal accepts transmission of his or her detailed personal information. If the server receives a reply message that accepts the transmission of the detailed personal information from the second mobile terminal, the server transmits the detailed personal information for the user of the second mobile terminal to the first mobile terminal. In this way, exchanging personal information in a level-wise fashion can be carried out; i.e., minimum necessary information is first exchanged and detailed personal information is then exchanged, only if its transmission is accepted.

SUMMARY OF THE INVENTION

However, the system for communication services between terminals disclosed in the above JP-A No. 2001-333451 is arranged such that mobile terminals, once located within a range of short range wireless communications, first exchange minimum necessary information with each other. Hence, if a number of mobile terminals are located within the range of short range wireless communications, then such data exchange is performed among the number of mobile terminals. There is a problem that this situation makes it difficult for each mobile terminal user to recognize a person with whom data exchange was performed.

Moreover, the system for communication services between terminals disclosed in the above JP-A No. 2001-333451 is arranged such that such data exchange is performed transparently to the users of the mobile terminals. Hence, every time mobile terminals have entered the range of short range wireless communications, data exchange is performed therebetween. There is another problem that it is difficult to recognize date/time when the data exchange was performed and where the data exchange was performed.

Addressing the above problems, the present invention is intended to provide a mobile terminal device, a computer executable program for exchanging personal information, and a method and system for exchanging personal information, which can make it easy to identify a user with whom, where, and date/time when exchanging personal information was performed.

According to one embodiment of the present invention, there is provided a mobile terminal device including:

a short range wireless communications means for performing short range wireless communications;

a personal information storage means adapted to store a set of simple personal information relevant to the user of the mobile terminal device and a set of contact information for the user attached to the set of simple personal information and inhibited from being displayed on a device receiving this information;

a sending/receiving control means to control the short range wireless communications means to send the set of simple personal information and the set of contact information stored in the personal information storage means to a peer device with which the mobile terminal device is in communication to exchange personal information and to control the short range wireless communications means to receive a set of simple personal information and a set of contact information relevant to and provided by a peer user;

an automatically grouping and registering means to group and register respective sets of simple personal information and respective sets of contact information for respective peer users with whom the user exchanged personal information, received for a predetermined period of time through the short range wireless communications means, into a storage means; and a display control means to display, from among the sets of simple personal information and the sets of contact information for peer users in a group registered in the storage means by the automatically grouping and registering means, only the sets of simple personal information on a display means.

Another embodiment of the present invention relates to a computer executable program for exchanging personal information, including instructions that, when executed by a computer of a mobile terminal device, cause a processor of the computer to perform the following:

controlling a short range wireless communications means so that, from a personal information storage means in which a set of simple personal information relevant to the user of the mobile terminal device and a set of contact information for the user attached to the set of simple personal information and inhibited from being displayed on a device receiving this information, the communications means sends the set of simple personal information and the set of contact information to a peer device with which the mobile terminal device is in communication to exchange personal information and receives a set of simple personal information and a set of contact information relevant to and provided by a peer user;

grouping and registering respective sets of simple personal information and respective sets of contact information for respective peer users with whom the user exchanged personal information, received for a predetermined period of time through the short range wireless communications means, into a storage means;

and displaying, from among the sets of simple personal information and the sets of contact information for peer users in a group registered in the storage means, only the sets of simple personal information on a display means.

A further embodiment of the present invention relates to a method for exchanging personal information between mobile terminal devices, including the steps of:

controlling a short range wireless communications means so that, from a personal information storage means in which a set of simple personal information relevant to the user of a mobile terminal device and a set of contact information for the user attached to the set of simple personal information and inhibited from being displayed on a device receiving this information, the communications means sends the set of simple personal information and the set of contact information to a peer device with which the mobile terminal device is in communication to exchange personal information and receives a set of simple personal information and a set of contact information relevant to and provided by a peer user;

grouping and registering respective sets of simple personal information and respective sets of contact information for respective peer users with whom the user exchanged personal information, received for a predetermined period of time through the short range wireless communications means, into a storage means; and displaying, from among the sets of simple personal information and the sets of contact information for peer users in a group registered in the storage means, only the sets of simple personal information on a display means.

A further embodiment of the present invention relates to a system for personal information exchange between mobile terminal devices, including mobile terminal devices and a server device, each mobile terminal device including:

a short range wireless communications means for performing short range wireless communications;

a wireless communications means for performing wireless communications via a wireless base station;

a personal information storage means adapted to store a set of simple personal information relevant to the user of the mobile terminal device, a set of contact information for the user including a user identifier assigned to each user from a server device on a certain network, URL (Uniform Resource Locator) of the server device, and an e-mail address registered associated with the user identifier in a database on the server device, wherein the set of contact information is attached to the set of simple personal information and inhibited from being displayed on a device receiving this information, and a set of detailed personal information for the user;

a sending/receiving control means to control the short range wireless communications means to send the set of simple personal information and the set of contact information stored in the personal information storage means to a peer device with which the mobile terminal device is in communication to exchange personal information and to control the short range wireless communications means to receive a set of simple personal information and a set of contact information relevant to and provided by a peer user;

an automatically grouping and registering means to group and register respective sets of simple personal information and respective sets of contact information for respective peer users with whom the user exchanged personal information, received for a predetermined period of time through the short range wireless communications means, into a storage means;

a display control means to display, from among the sets of simple personal information and the sets of contact information for peer users in a group registered in the storage means by the automatically grouping and registering means, only the sets of simple personal information on a display means; and a communication control means that, when a desired set of simple personal information for a peer user is selected from among the sets of simple personal information for peer users in a group displayed on the display means and a request is made to send the set of the user's detailed personal information, controls the wireless communications means to access the server device based on the URL from the set of contact information attached to the selected set of simple personal information and send the user identifier of the peer user, the user identifier of the user of the mobile terminal device, and the set of detailed personal information to the server device, and the server device including:

a user identifier issuance means to issue and deliver a user identifier to a mobile terminal device;

a database adapted to store the e-mail address of each user associated with each user identifier issued by the user identifier issuance means;

a user authentication means that, upon receiving the user identifier of the peer user, the user identifier of the user of the mobile terminal device, and the set of detailed personal information from the mobile terminal device, performs user authentication based on the user identifier of the user of the mobile terminal device by referring to the database; and a forwarding means that, when the user of the mobile terminal user has been authenticated as a valid user by the user authentication means, retrieves the e-mail address of the peer user from the database based on the user identifier of the peer user, and forwards the set of detailed personal information for the user of the mobile terminal device to the e-mail address.

In these embodiments of the present invention, respective sets of simple personal information and respective sets of contact information for respective peer users received for a predetermined period of time through the short range wireless communications means are automatically grouped and displayed on the display means. Thus, the user can recognize peers with whom the user exchanged simple personal information on a group basis. Hence, this advantageously helps the user to identify a person with whom the user exchanged simple personal information. This advantage that the user can recognize peers with whom the user exchanged simple personal information on a group basis also helps the user to recall or even identify when and where the user exchanged simple personal information.

An embodiment of the invention, by automatically grouping and displaying respective sets of simple personal information and respective sets of contact information for respective peer users received for a predetermined period of time through the short range wireless communications means, enables the user to recognize peers with whom the user exchanged simple personal information on a group basis and helps the user to identify a person with whom, when, and where the user exchanged simple personal information.

BRIEF DESCRIPTION OF THE DRAWINGS

Embodiments of the present invention will be described in detail based on the following figures, wherein.

DETAILED DESCRIPTION OF PREFERRED EMBODIMENTS

The present invention is applicable to a system for exchanging personal information where mobile phones exchange personal information with each other in a level-wise fashion.

[Framework of a System for Exchanging Personal Information]

Figure 1:
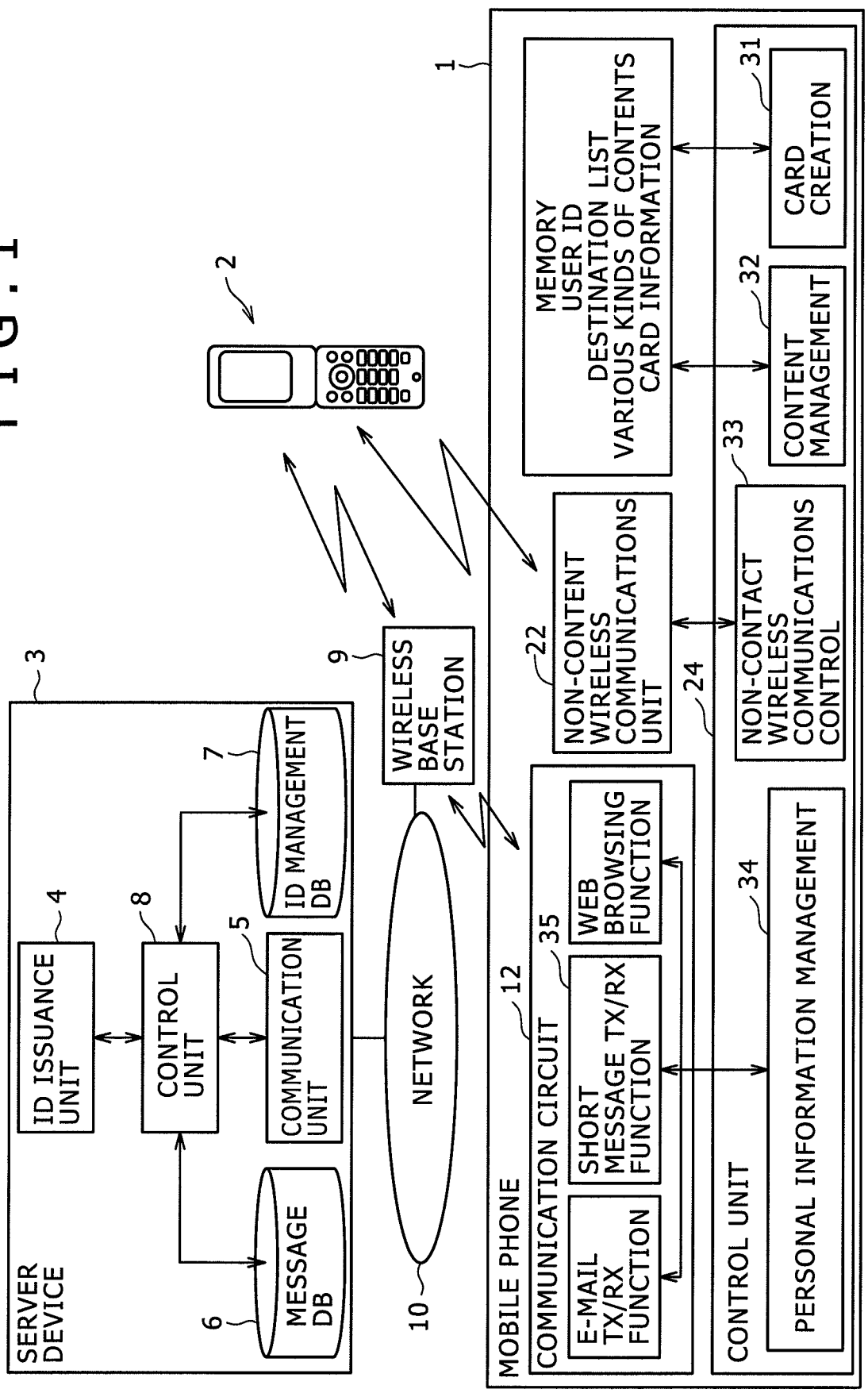
FIG. 1 is a diagram depicting a framework of a system for exchanging personal information, illustrated as an exemplary embodiment to which the present invention is applied.

A system for exchanging personal information, which is illustrated as an exemplary embodiment to which the present invention is applied, as depicted in FIG. 1, includes a first mobile phone 1, a second mobile phone 2, and a server device 3 which performs, inter alia, user identifier (user ID) issuance to each user and its management and transfer of detailed personal information.

The server device 3 includes an ID issuance unit 4 that issues a user identifier (ID) to each user, a communication unit 5 for communicating with each mobile phone 1, 2, a message database 6 (message DB) that preserves short messages and e-mails from each user, an ID management DB 7 in which user IDs issued to users, e-mail addresses of the users associated with the user IDS, etc. are stored, a control unit 8 that controls all operations of the server device 3.

Each mobile phone 1, 2 and the server device 3 are interconnected via a wireless base station 9 to which the mobile phone is attached and a network 10 such as a communications network or Internet. In this example, to simplify explanation and make it easily understandable, a description is provided assuming that exchanging personal information is performed between the first mobile phone 1 and second mobile phone 2. However, exchanging personal information may be performed among three or more mobile phones. In this case as well, functions and operations are the same and, therefore, the following description should be referred to.

[Mobile Phone Configuration]

Figure 2:
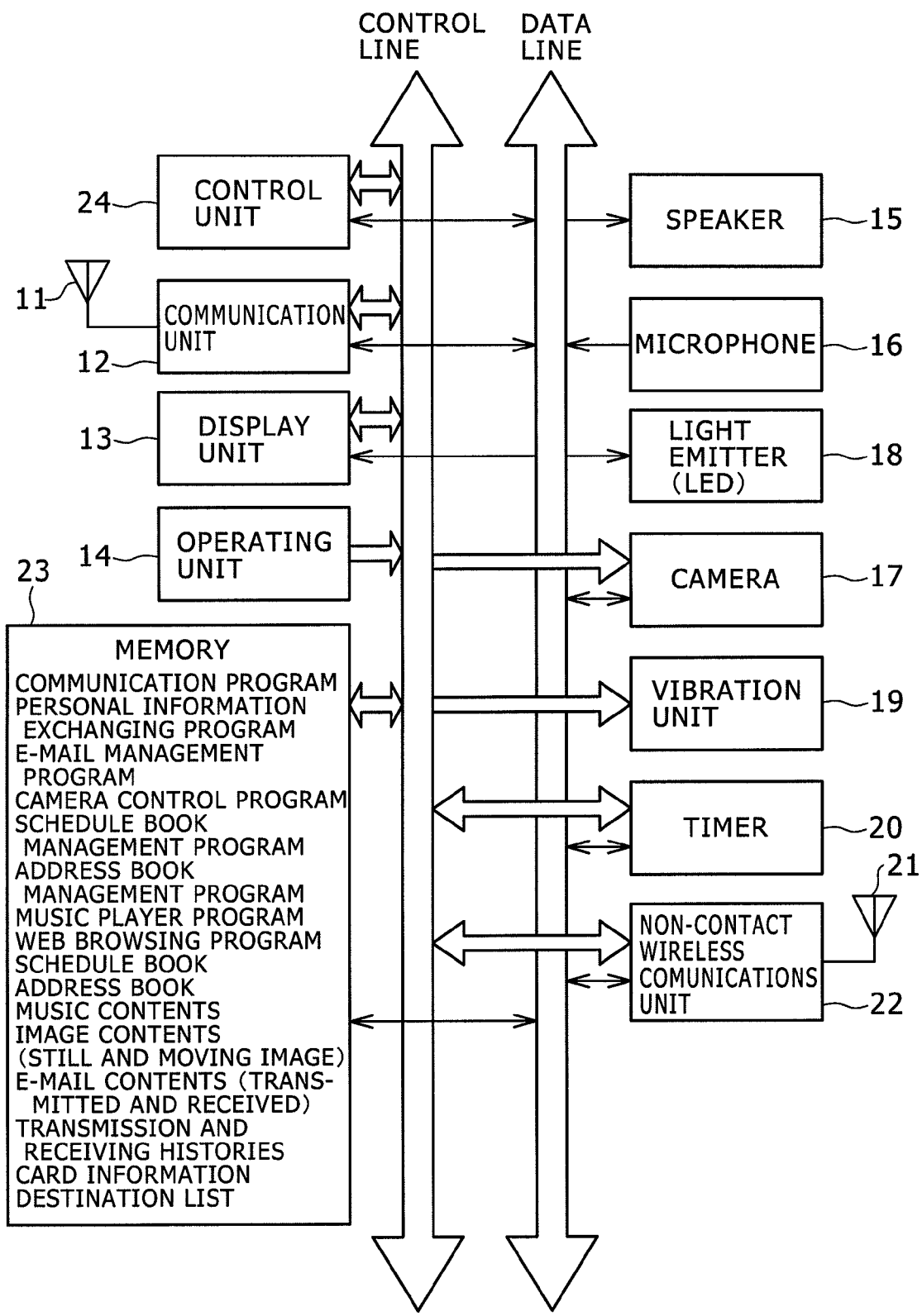
FIG. 2 is a block diagram of a mobile phone used in the system for exchanging personal information of the exemplary embodiment.

Each of the mobile phone 1 and the mobile phone 2, as depicted in FIG. 2, includes an antenna 11 and a communication circuit 12 responsible for wireless communication of voice conversation, videophone conversation, e-mails, short messages, Web (World Wide Web) data, etc. with the wireless base station 9, a display unit 13 responsible for displaying operational menus, e-mails, images (still and moving images), personal information exchanged, etc., an operating unit 14 used by a user to select a desired menu option and enter personal information and input a command to display, transmit, or perform other action, a speaker 15 for outputting voice received or the like, a microphone 16 for collecting voice to transmit or the like, a camera 17 for capturing an still or moving image of a desired object, and a light emitter 18 (LED, Light Emitting Diode) for alerting the user of transmission or receiving with light.

Each mobile phone 1, 2 further includes a vibration unit 19 for alerting the user of transmission or receiving by vibrating the mobile phone chassis, a timer 20 for time counting, an antenna 21 and a non-contact wireless communications unit 22 responsible for non-contact wireless communications within a range of, for example, several centimeters to several tens of centimeters, a memory 23 in which a communication program for processing for wireless communications via the wireless base station 4, various application programs, various kinds of data (contents) which are handled by these application programs, and others are stored, and a control unit 24 that controls all operations of the mobile phone.

In the memory, 23, in addition to the above communication program, a personal information exchanging program enabling exchanging personal information, an e-mail management program for control of e-mail creation and its transmission and receiving, a camera control program for control of image capture by the camera 17, a schedule book management program for managing a schedule book in which a schedule of the user is registered, an address book management program for managing an address book, a music player program for playing music contents, and a Web browsing program responsible for communication with the server device 3 installed in a certain network 5 such as a communications network or Internet are stored.

In the memory 23, a schedule book in which a desired schedule of the user is registered, an address book in which user names of acquaintances and friends of the user as well as their still images (such as photographs of their faces), addresses, phone numbers, e-mail addresses, birth dates, etc. are registered, music contents which are played by the music player program, still and moving image contents which are displayed by a viewer function of the camera control program, e-mail contents transmitted and received, transmission and receiving histories of calls and e-mails, personal information for each user (card information) acquired by exchanging personal information, a destination list in which the user name and contact information for each of other users with whom personal information has been exchanged are registered, etc. are further stored.

In the system for exchanging personal information of this embodiment, exchanging personal information is performed as follows: first, exchange of information contained in a white card in which simple personal information is recorded takes place; once a confidential relationship has been established between users, exchange of information contained in a pink card in which detailed personal information is recorded takes place. The users of white cards whose information has been exchanged for a predetermined period of time are automatically grouped as one group. The control unit 24 forms blue card information into which information elements from the white cards of the grouped users are combined and performs management of each group based on the blue card information. In the memory 23, these white card information, pink card information, and blue card information are stored as the above-mentioned card information.

To each white card having simple personal information recorded therein, contact information of the user who is the source of the white card is attached. The contact information attached to the white card information is inhibited from being displayed on a device such as a mobile phone. That is, the contact information attached to the white card information is concealed from a third party such as a user who acquired the white card information through personal information exchange. Although the user name and contact information for each of other users with whom white card information has been exchanged are registered in the destination list on the memory 23, the control unit 24 hides the above contact information, even when it displays this destination list on the display unit 13.

As the contact information, for example, phone number, e-mail address, etc. may be used. However, in the case of the system for exchanging personal information of the present embodiment, a user identifier (user ID) issued to each user (each mobile phone) from the server device 3 is attached to white card information. As will be described later, a user who acquired white card information creates a short message, when the user wants to contact with the source user of the white card information. The control unit 24 attaches the user ID of the source user of the white card information to the created short message transparently to the user who sends the short message and transmits the message to the server device 3 (the short message is created and transmitted to the server device 3, the destination user ID of the message being concealed from the user who created the short message).

The server device 3 finds the e-mail address of the source user of the white card information, based on the concealed user ID attached to the short message, and transmits the above short message to this e-mail address. Thereby, the user who received white card information can contact with the source user of the white card information, while the contact information of the source user remains concealed.

To each white card having simple personal information recorded therein, a validity period of the white card can be added. As will be described later, the control unit of a mobile phone, upon receiving white card information with a validity period, if the present time is beyond the validity period added to the received white card information, automatically deletes the received white card information from the memory.

[System Operation]

Then, system operation of the system for exchanging personal information having constituent elements described above is explained.

[User Registration]

A user who is going to make use of this system for exchanging personal information is to register with the server device 3 in advance. In particular, the user accesses the server device 3 through a mobile phone 1 (or mobile phone 2) and sends necessary information such as user name, desired password, and e-mail address. The control unit 8 of the server device 3, upon receiving the necessary information, issues a user ID through the ID issuance unit 4 and registers the issued user ID associated with, inter alia, the user name, password, and e-mail address sent from the user's mobile phone 1 into the ID management DB 7. The control unit 8 of the server device 3 also transmits the issued user ID to the user's mobile phone 1 through the communication unit 5.

The control unit 24 of the mobile phone 1 stores the user ID issued by the server device 3 together with URL (Uniform Resource Locator) information of the server device 3 into the memory 23, based on the personal information exchanging program stored on the memory 23. Thereby, the user who received the user ID becomes able to make use of the system for exchanging personal information.

In this example, a user who is going to make use of the system for exchanging personal information is to receive the user ID from the server device 3 in advance. This operation may be arranged so that, each time the mobile phone 1 (or mobile phone 2) is activated, the control unit 24 receives the user ID from the server device 3.

[Creating a White Card]

Then, the user creates a white card having simple personal information to be first sent to a peer mobile phone during exchange of personal information. FIG. 3(a) to FIG. 3(l) depicts display screens changing in creating the white card. If a white card has not yet been created, when the personal information exchanging program is activated by the user, the control unit 24 of the mobile phone 1 (or mobile phone 2) displays a screen with a message prompting the user to create a white card, for example, "Create a white card" as shown in FIG. 3(c), on the display unit 13, following display screens shown in FIG. 3(a) and FIG. 3(b). In response to this message, when the user opts to create a white card, the control unit 24 displays an input screen with a menu including user name (nickname), comment, photo, and validity period, as shown in FIG. 3(d), on the display unit 13, based on a card creation function 31 shown in FIG. 1, one of the functions on the basis of the personal information exchanging program.

When the user chooses to input user name (nickname), the control unit 24 displays an input screen for user name (nickname) as shown in FIG. 3(e) on the display unit 13, based on the card creation function 31. When the user enters a desired user name to the input screen and registers it for the time being, the control unit 24 temporarily stores the entered user name (nickname) into the memory 23.

When the user chooses to input comments, as shown in FIG. 3(f), the control unit 24 displays an input screen for comments as shown in FIG. 3(g) on the display unit 13, based on the card creation function 31. When the user enters a desired comment, e.g., "Nice to meet you! Thanks in advance" to the input screen and registers it for the time being, the control unit 24 temporarily stores the entered comment into the memory 23.

When the user chooses to input a photo, as shown in FIG. 3(h), the control unit 24 displays a "photo shoot" menu for activating the camera 17 to take a photograph and a "choose from album" menu for choosing a desired photo from among photographs that have previously been taken, as shown in FIG. 3(i), on the display unit 13, based on the card creation function 31. If the user chooses the "photo shoot" menu, the control unit 24 activates the camera 17 to allow the user to take a desired photograph. When the user takes a desired photograph (still image) and registers it for the time being, the control unit 24 temporarily stores the still image captured by the camera 17 into the memory 23.

On the other hand, if the user selects the "choose from album" menu, the control unit 24 displays still images stored in the memory 23 on the display unit 13. When the user selects a desired still image from among the displayed still images and registers it for the time being, the control unit 24 temporarily stores the still image selected by the user into the memory 23.

The white card is used for simple self-introduction purposes. Thus, in most cases, the user takes a photograph of his or her face, when taking a photograph from the "photo shoot" menu, or the user selects his or her photograph or a still image suitable for his or her avatar, when selecting a desired photograph from the "choose from album" menu.

When the user chooses to input a validity period of the white card, as shown in FIG. 3(k), the control unit 24 displays an input screen for validity period as shown in FIG. 3(l) on the display unit 13, based on the card creation function 31. When the user enters a desired validity period to the input screen and registers it for the time being, the control unit 24 temporarily stores the entered validity period into the memory 23.

After the user registers the user name (nickname), desired comments, desired photograph, and validity period for the time being, the user saves the user name (nickname), desired comments, desired photograph, and validity period. Upon saving them, the control unit 24 stores the user name (nickname), desired comments, desired photograph, and validity period into the memory 23 as white card information. Thereby, a white card has now been created in which simple personal information having the user name (nickname), desired comments, desired photograph, and validity period has been registered. In this example, user name (nickname), desired comments, desired photograph, and validity period are registered to create a white card. However, the user name (nickname) as a necessary input and, besides, one or two of other input items of desired comments, desired photograph, and validity period may be registered to create a white card.

A white card is created by registering the user name (nickname), desired comments, desired photograph, and validity period, as above. Then, further personal information can be added (registered) to the white card. In particular, after the user name (nickname), desired comments, desired photograph, and validity period, as above, are registered, the control unit 24 stores them into the memory 23 and also displays an "edit white card" menu, an "add personal information" menu, and a "delete added personal information" menu, as shown in FIG. 3(j), on the display unit 13.

If the user chooses the "edit white card" menu, the control unit 24 returns the display screen on the display unit 13 to the input screen with the menu including user name and others as shown in FIG. 3(d). Thereby, the user is allowed to reenter (edit) user name and others at this input screen. If the user chooses the "delete added personal information" menu, the control unit 24 makes the transition to a mode of deleting added personal information in which added personal information can be deleted, as will be described later.

On the other hand, if the user chooses the "add personal information" menu, the control unit 24 displays a menu for adding personal information, which is shown in FIG. 4(b), on the display unit 13, following the above menu select screen which is shown in FIG. 4(a). By way of example, the control unit 24 displays an "add a favorite tune" menu, an "add a favorite photo" menu, an "add your favorite blog and social networking site (SNS)" menu, and a "create pink card" menu, wherein a pink card contains detailed personal information entered, which will be described later, as the menu items for adding personal information, on the display unit 13.

(Adding a Favorite Tune)

If the user chooses the "add a favorite tune" menu, the control unit 24 displays a "select a tune" menu for selecting a new favorite tune and, if favorite tunes have already been selected, the titles of the tunes of music contents selected, as shown in FIG. 4(c), on the display unit 13. FIG. 4(c) gives an example of display where two tunes of music contents, tune A and tune B have been selected as favorite tunes.

If the user chooses the "select a tune" menu for selection of a new favorite tune, the control unit 24 displays an input screen for artist name, album title, and track number relevant to a favorite tune to be added newly, as shown in FIG. 4(d), on the display unit 13, based on a content management function 32 of the personal information exchanging program, shown in FIG. 1.

When the user enters an artist name, album title, and track number, the control unit 24 displays the artist name, album title, and tune title which are metadata of music content corresponding to the artist name, album title, and track number entered by the user from the music contents stored in the memory 23, as shown in FIG. 4(e), on the display unit 13. The user makes sure of the music content to be added as a favorite tune, based on the metadata displayed on the display unit 13, and then, adds the music content through the operating unit 14. Once the music content has been added, the control unit 24 adds the tile of the tune of the newly added music content to the list of favorite tunes selected, shown in FIG. 4(c), on the display unit 13.

Here, if some of the music contents displayed in the list of tunes is not to be added to the white card information, the user may choose a music content not to be added and cancel its addition through the operating unit 14, as shown in FIG. 4(f).

When the user cancels the addition, the control unit 24 displays a confirmation message for the cancellation, e.g., "Do you cancel the addition of the tune?", as shown in FIG. 4(h), on the display unit 13. After confirming the user's intention, the control unit 24 removes the tune canceled by the user from the displayed tune list of music contents. Note that the music content for which the addition to the white card has been canceled is not deleted from the memory 23. The metadata of the music content for which the addition has been canceled is just not added to the white card information.

If the user wants to check detailed information for the tune to be canceled before canceling its addition, the user may choose the title of the tune of music content to be checked on detailed information and bring up its detailed information through the operating unit 14, as shown in FIG. 4(f). When the detailed information is brought up, the control unit 24 displays metadata such as artist name, album title, tune title, album jacket, etc. relevant to the music content corresponding to the tune title chosen by the user, as shown in FIG. 4(g), on the display unit 13. Thereby, the user can cancel the addition of the music content after recognizing its details.

Then, by adding a new music content and/or canceling the addition, the user has only the tiles of the tunes of desired music contents displayed on the display unit 13 and, then, registers these tunes into the white card through the operating unit 14. Upon this registration, the control unit 24 adds the metadata such as artist names, album titles, tune titles, album jackets, etc. relevant to the music contents of the tune titles displayed on the display unit 13 to the white card information stored on the memory 23 as the user's favorite tunes. Thereby, information for introducing favorite tunes can be added to the previously registered white card information.

(Adding a Favorite Photo)

If the user chooses an "add a favorite photo" menu, as shown in FIG. 5(a) and FIG. 5(b), the control unit 24 displays a "select a photo" menu for selection of a new favorite photo and, if a favorite photo has already been selected, the designation, expansion, and a thumbnail image of the photo selected, as shown in FIG. 5(c), on the display unit 13. FIG. 5(c) gives an example of display where a still image content with a designation of "DCS008" in a "jpg" format has been selected as a favorite photo.

If the user chooses the "select a photo" menu for selection of a new favorite photo, the control unit 24 displays the names of folders in which still image contents are stored, as shown in FIG. 5(d), on the display unit 13, based on the content management function 32 of the personal information exchanging program, shown in FIG. 1. FIG. 5(d) gives an example of display where the name of a camera album folder containing still image contents captured by the camera 17 and the name of a picture folder containing still image contents imported via a network or from an external memory are displayed as the names of folders in which still image contents are stored.

When the user choose a desired folder name, the control unit 24 displays a list of thumbnail images of still images stored in the folder selected by the user from the still image contents stored in the above folders on the memory 23, as shown in FIG. 5(e), on the display unit 13. From the list of thumbnail images displayed on the display unit 13, the user checks on a still image content to be added as a favorite photo and, then, selects the still image content through the operating unit 14. Once a photo has been selected, the control unit 24 displays the destination, expansion, and thumbnail image of the newly selected still image content under the destination, etc. of the previously selected favorite photo shown in FIG. 5(c), on the display unit 13.

Here, if some of the photos (still image contents) whose destinations, etc. are displayed in a list is not to be added to the white card information, the user may choose the designation, etc. of a photo not to be added and cancel its addition through the operating unit 14, as shown in FIG. 5(f). When the user cancels the addition, the control unit 24 displays a confirmation message for the cancellation, e.g., "Do you cancel the addition of the photo?", as shown in FIG. 5(h), on the display unit 13. After confirming the user's intention, the control unit 24 removes the destination, etc. of the photo canceled by the user from the displayed list of the designations, etc. of photos. Note that the still image content for which the addition to the white card has been canceled is not deleted from the memory 23. The metadata of the photo (still image content) for which the addition has been canceled is just not added to the white card information.

If the user wants to check the photo image to be canceled before canceling its addition, the user may choose the destination, etc. of the photo to be checked and bring up the photo image through the operating unit 14, as shown in FIG. 5(f). When the photo image is brought up, the control unit 24 displays the still image content corresponding to the designation, etc. chosen by the user, as shown in FIG. 5(g), on the display unit 13. Thereby, the user can cancel the addition of the photo after recognizing its image.

Then, by adding a new photo and/or canceling the addition, the user has only the designations, etc. of desired photos displayed on the display unit 13 and, then, registers these photos into the white card through the operating unit 14. Upon this registration, the control unit 24 adds the metadata such as designations, expansions, and thumbnail images of the still image contents corresponding to the designations, etc. displayed on the display unit 13 to the white card information stored on the memory 23 as user's favorite photos. Thereby, information for introducing favorite photos can be added to the previously registered white card information.

(Menu for Adding a User's Blog and Favorite Social Networking Site)

If the user chooses an "add your blog and a favorite social networking site (SNS)" menu, as shown in FIG. 6(a) and FIG. 6(b), the control unit 24 displays a "select blog and SNS" menu for selecting a new blog or a new favorite SNS and, if a blog and SNS have already been added, the names of the blog and SNS added, as shown in FIG. 6(c), on the display unit 13. FIG. 6(c) gives an example of display where a user's blog "○○ blog" and "xx SNS" have been selected as user's blog and favorite SNS.

If the user chooses the "select blog and SNS" menu for selection of a new blog or SNS", the control unit 24 displays the name of a blog or SNS which has not yet been selected as additional information to the white card from the blogs or SNSs registered on the memory 23 by the user, as shown in FIG. 6(d), on the display unit 13. FIG. 6(d) gives an example where "SNS" is displayed as a blog or SNS which has not yet been selected as additional information to the white card.

When the user chooses a desired blog name or SNS name, the control unit 24 displays an input screen for user ID and password which are necessary to login to the selected blog or SNS, as shown in FIG. 6(e), on the display unit 13. The user enters a user ID and password to the input screen displayed on the display unit 13. The control unit 24 verifies the user ID and password entered by the user, based on the user ID and password for the blog or SNS stored on the memory 23. If the user ID and password entered by the user are valid, the control unit 24 displays a message asking if the user wants to register the user ID and password entered by the user, e.g., "Do you register ID?", as shown in FIG. 6(f), on the display unit 13.

If, in response to this message, the user accepts the registration of the user ID and password through the operating unit 14, the control unit 24 adds the new selected blog name or SNS name to the list of blog and SNS names which have been selected, shown in FIG. 6(c), on the display unit 13. In the case of FIG. 6(c), then, the new selected SNS name "SNS" is added to the list including "oo blog" and "xx SNS".

Here, if some of the blogs and SNSs whose names are displayed in the list is not to be added to the white card information, the user may choose the name of a blog or SNS not to be added and cancel its addition through the operating unit 14, as shown in FIG. 6(g). When the user cancels the addition, the control unit 24 displays a confirmation message for the cancellation, e.g., "Do you cancel the addition of the blog or SNS?", as shown in FIG. 6(h), on the display unit 13. After confirming the user's intention, the control unit 24 removes the blog name or SNS name canceled by the user from the displayed list of the blog names and SNS names. Note that information (such as URL (Uniform Resource Locator), user ID, password, etc.) about the blog or SNS for which the addition to the white card has been canceled is not deleted from the memory 23. The blog or SNS for which the addition has been canceled is just not added to the white card information.

If the user wants to check the blog or SNS to be canceled before canceling its addition, the user may choose the name of the blog or SNS to be checked and bring up it through the operating unit 14, as shown in FIG. 6(g). When the blog or SNS is brought up, the control unit 24 displays the blog or SNS name chosen by the user and its URL information, as shown in FIG. 6(i), on the display unit 13. Thereby, the user can cancel the addition of the blog or SNS after recognizing it.

Then, by adding a new blog or SNS and/or canceling the addition, the user has only the names of desired blogs and SNSs displayed on the display unit 13 and, then, registers them into the white card through the operating unit 14. Upon this registration, the control unit 24 adds the new blog or SNS displayed on the display unit 13, URL information for the blog or SNS, and user ID and password for the blog or SNS to the white card information stored on the memory 23 as user's blog and favorite SNS. Thereby, information for introducing the user's blog and favorite SNS can be added to the previously registered white card information.

[Creating a Pink Card]

While the foregoing description relates to creation of a white card containing simple personal information, creating a pink card containing detailed personal information will be explained below. The white card is sent to a peer's mobile phone for initial exchange of personal information, whereas the pink card is sent to the peer's mobile phone after a certain level of confidence is attained in communication with the peer. Although it is desirable to send the pink card to the peer after a certain level of confidence is attained in communication with the peer, it is also possible to send the pink card with the white card by user setting, as will be described later.

Figure 7:
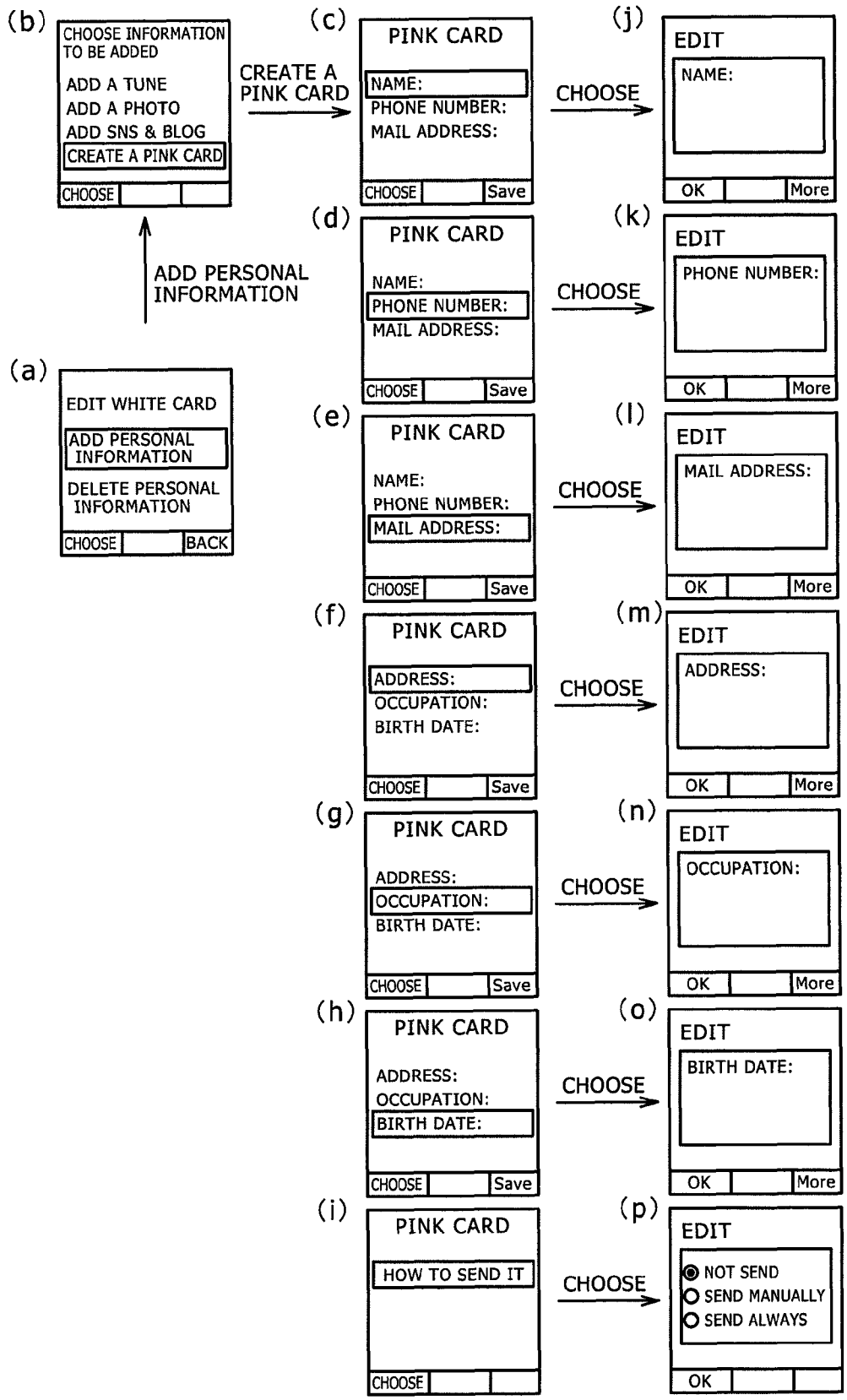
FIG. 7 illustrates an operation of creating a pink card on a mobile phone used in the system for exchanging personal information of the exemplary embodiment.

FIG. 7(a) to FIG. 7(p) depicts display screens changing in creating the pink card. In the mobile phone of the present embodiment, the pink card is managed as additional information to the white card. When the "add personal information" menu is chosen from among the menus of "edit white card", "add personal information", and "delete added personal information" as shown in FIG. 7(a), the control unit 24 of the mobile phone 1 (or mobile phone 2) displays a "create a pink card" menu together with the menus of "add a favorite tune", "add a favorite photo" and "add your blog and favorite SNS", shown in FIG. 7(b), on the display unit 13.

When the user chooses the "create a pink card" menu through the operating unit 14, the control unit 24 displays menus for entry of "name", "phone number", "e-mail address", "address", "occupation", "birth date" and "select how to send the pink card", as shown in FIG. 7(c) to FIG. 7(i), on the display unit 13, based on the card creation function 31 (see FIG. 1) on the basis of the personal information exchanging program.

When the user chooses the "name" entry menu shown in FIG. 7(c) through the operating unit 14, the control unit 24 displays an input screen for name, as shown in FIG. 7(j), on the display unit 13. When the user enters his or her name (maybe nickname or the like) to the input screen, the control unit 24 temporarily stores the entered name into the memory 23 or the like.

When the user chooses the "phone number" entry menu shown in FIG. 7(d) through the operating unit 14, the control unit 24 displays an input screen for phone number, as shown in FIG. 7(k), on the display unit 13. When the user enters his or her phone number to the input screen, the control unit 24 temporarily stores the entered phone number into the memory 23 or the like.

When the user chooses the "e-mail address" entry menu shown in FIG. 7(e) through the operating unit 14, the control unit 24 displays an input screen for e-mail address, as shown in FIG. 7(l), on the display unit 13. When the user enters his or her e-mail address to the input screen, the control unit 24 temporarily stores the entered e-mail address into the memory 23 or the like.

When the user chooses the "address" entry menu shown in FIG. 7(f) through the operating unit 14, the control unit 24 displays an input screen for address, as shown in FIG. 7(m), on the display unit 13. When the user enters his or her address to the input screen, the control unit 24 temporarily stores the entered address into the memory 23 or the like.

When the user chooses the "occupation" entry menu shown in FIG. 7(g) through the operating unit 14, the control unit 24 displays an input screen for occupation, as shown in FIG. 7(n), on the display unit 13. When the user enters his or her occupation to the input screen, the control unit 24 temporarily stores the entered occupation into the memory 23 or the like.

When the user chooses the "birth date" entry menu shown in FIG. 7(h) through the operating unit 14, the control unit 24 displays an input screen for birth date, as shown in FIG. 7(o), on the display unit 13. When the user enters his or her birth date to the input screen, the control unit 24 temporarily stores the entered birth date into the memory 23 or the like.

When the user chooses the "select how to send the pink card" menu shown in FIG. 7(i) through the operating unit 14, the control unit 24 displays a screen for choosing among a "not send" menu to disable sending of the pink card, a "send manually" menu to manually send the pink card, and a "send always" menu to send the pink card with the white card, as shown in FIG. 7(p), on the display unit 13. When the user chooses a desired menu form these menus displayed on the screen, the control unit 24 temporarily stores the chosen menu into the memory 23 or the like.

After the entry of detailed personal information such as user's name, phone number, etc., when the user registers this information through the operating unit 14, the control unit 24 registers the detail personal information and information indicating how to send the pink card information (see FIG. 7(p)), temporarily stored on the memory 23, into the memory 23 as the pink card information. Thereby, the white card containing simple personal information as well as the pink card containing detailed personal information have been registered in the memory 23.

[Exchanging White Cards]

Figure 8:
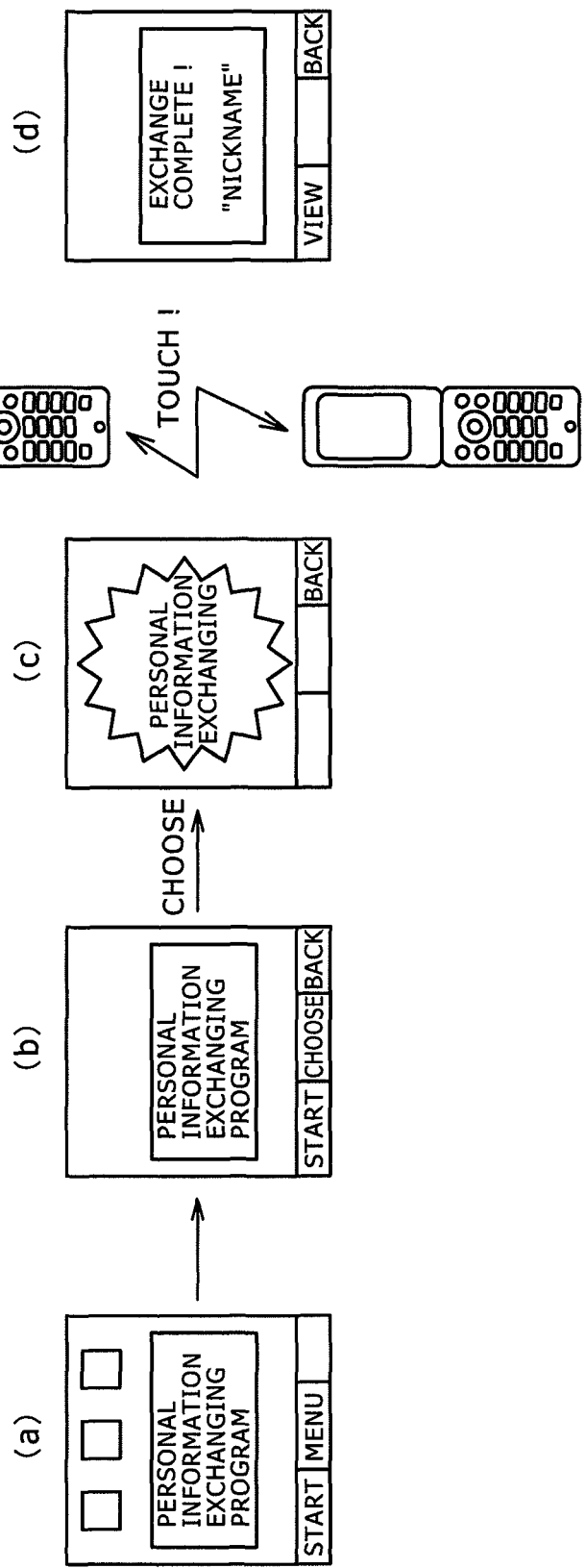
FIG. 8 schematically illustrates a white card exchanging operation in the system for exchanging personal information of the exemplary embodiment.

When the user completes creating at least a white card, the user can exchange personal information with another user. FIG. 8(a) to FIG. 8(d) schematically illustrates a flow of this exchange of personal information. When the user wants to exchange personal information, from a list of application programs shown in FIG. 8(a), the user chooses the personal information exchanging program as shown in FIG. 8(b). Then, the control unit 24 displays the program name of the personal information exchanging program chosen by the user, as shown in FIG. 8(c), on the display unit 13.

Then, the user starts the personal information exchanging program. When the program is started, the control unit 24 activates the non-contact wireless communications unit 22, using a non-contact wireless communications control function 33 on the basis of the personal information exchanging program shown in FIG. 1. When the mobile phone gets close to a peer mobile phone for exchanging personal information (the distance between both mobile phones falls within a range in which their non-contact wireless communications units can communicate with each other), the mobile phone sends white card information stored in its memory 23 to the peer mobile phone in a non-contact wireless fashion and receives white card information sent from the peer mobile phone in a non-contact wireless fashion. The received white card information is displayed on the display unit 13, as shown in FIG. 8(d).

During initial exchange of personal information using the non-contact wireless communications unit, exchange of only the white card information having the user name (nickname), comments, photo, and validity period, described with FIG. 3(a) to FIG. 3(l), is performed. "Additional information (see FIGS. 4 to 6)" such as favorite tunes and photos, etc. added to the white card information and the pink card (see FIG. 7) containing detailed personal information are to be exchanged via the server device 3 shown in FIG. 1.

Although, after starting the personal information exchanging program, the mobile phone is brought close to the peer mobile phone 2 in this example, the personal information exchanging program may be set to keep running while the main power of the mobile phone is on. In this case, only by bringing the mobile phone close to the peer mobile phone without starting the personal information exchanging program, exchanging white card information can be performed.

Figure 9:
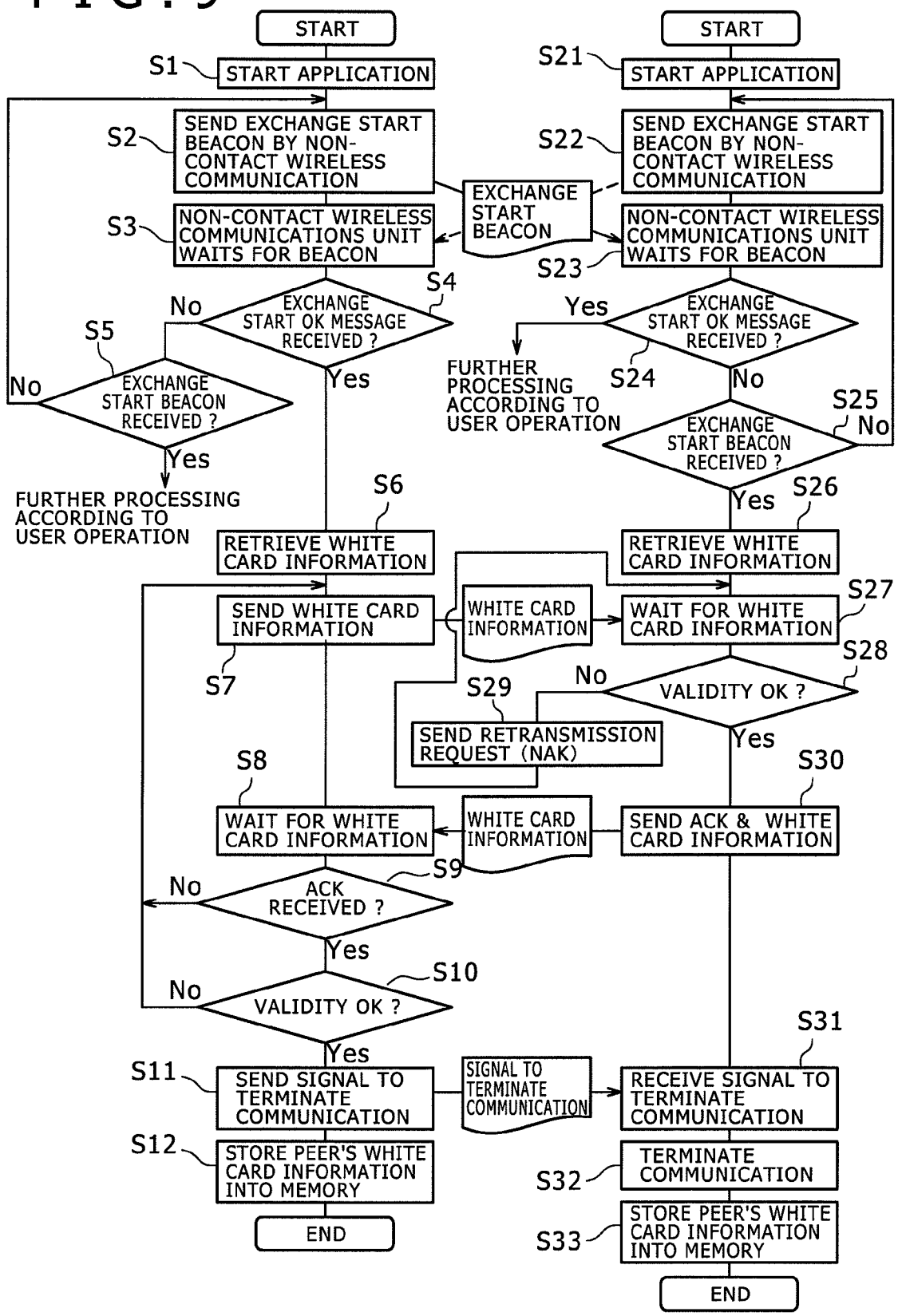
FIG. 9 is a flowchart of a white card exchanging operation in the system for exchanging personal information of the exemplary embodiment.

A flowchart of FIG. 9 illustrates a detailed flow of an operation of exchanging white cards between the mobile phone 1 and the mobile phone 2. In this flowchart, steps S1 to S12 represent the operation of the control unit 24 of the mobile phone 1 and steps S21 to S33 represent the operation of the control unit of the mobile phone 2.

First, the control unit 24 of the mobile phone 1 starts the process of this flowchart and starts the personal information exchanging program at step S1, when the personal information exchanging program is started by the user, as illustrated with FIG. 8(a) to FIG. 8(c). Likewise, the control unit of the mobile phone 2 starts the process of this flowchart and starts the personal information exchanging program at step S21, when the personal information exchanging program is started by the user.

Based on the started personal information exchanging program, the control unit 24 of the mobile phone 1 activates the non-contact wireless communications unit 22. At step S2, the control unit 24 controls the non-contact wireless communications unit 22 to send an exchange start beacon in a non-contact wireless fashion. At step S3, the control unit 24 controls the non-contact wireless communications unit 22 to wait for receiving an exchange start beacon sent from the mobile phone 2 in a non-contact wireless fashion. Likewise, the control unit of the mobile phone 2 controls the non-contact wireless communications unit, based on the started personal information exchanging program. At step 22, the control unit controls the non-contact wireless communications unit to send an exchange start beacon in a non-contact wireless fashion. At step S23, the control unit controls the non-contact wireless communications unit 22 to wait for receiving an exchange start beacon sent from the mobile phone 1 in a non-contact wireless fashion.

Then, the control unit of each mobile phone, once having received the exchange start beacon, sends an exchange start OK message that allows the mobile phone to start communication for exchanging white card information. At steps S4 and S5, the control unit 24 of the mobile phone 1 monitors whether the mobile phone has received an exchange start beacon sent from the mobile phone 2 and monitors whether the mobile phone has received an exchange start OK message sent from the mobile phone 2 upon receiving an exchange start beam sent from the mobile phone 1. Likewise, the control unit of the mobile phone 2, at steps S24 and S25, monitors whether the mobile phone has received an exchange start beacon sent from the mobile phone 1 and monitors whether the mobile phone has received an exchange start OK message sent from the mobile phone 1 upon receiving an exchange start beam sent from the mobile phone 2.

An event that the mobile phone has received the exchange start OK message means that the mobile phone 1 and the mobile phone 2 are located within a range in which non-contact wireless communication is enabled and that both phones can exchange white card information with each other. Thus, the control unit 24 of the mobile phone 1, at step S6, retrieves white card information from the memory 23. At step S7, the control unit 24 controls the non-contact wireless communications unit 22 to send the white card information in a non-contact wireless fashion. At step S8, the control unit 24 controls the non-contact wireless communications unit 22 to wait for receiving white card information sent from the mobile phone 2.

On the other hand, the control unit of the mobile phone 2 retrieves white card information from the memory at step S26 and controls the non-contact wireless communications unit to wait for receiving white card information sent from the mobile phone 1 at step S27. Upon receiving the white card information sent from the mobile phone 1, the control unit determines whether the white card information has been received successfully (performs a validity check) at step 28. If the white card information has not been received successfully, the control unit controls the non-contact wireless communications unit to send a NAK (Negative Acknowledge) signal to the mobile phone 1 at step S29. If the white card information has been received successfully, the control unit controls the non-contact wireless communications unit to send a ACK (Acknowledge) signal to the mobile phone 1 at step S30. In this step, the control unit also controls the non-contact wireless communications unit to send the white card information retrieved at the above step S26 in a non-contact wireless fashion.

At step S9, the control unit 24 of the mobile phone 1 then determines whether the mobile phone has received the NAK or ACK signal from the mobile phone 2. If the mobile phone has received the NAK signal, as determined, the process returns to step S7 and the control unit 24 controls the non-contact wireless communications unit 22 to retransmit the white card information to the mobile phone 2. Otherwise, if the mobile phone has received the ACK signal, as determined, the control unit 24 performs a validity check of the white card information received with the ACK signal from the mobile phone 2 at step S10. Upon determining that the white card information from the mobile phone 2 has been received successfully, the process goes to step S11. At this step, the control unit 24 controls the non-contact wireless communications unit 22 to send a signal to terminate the communication to the mobile phone 2. Then, at step S12, the control unit 24 stores the white card information received from the mobile phone 2 into the memory 23 and terminates the entire process as illustrated in the flowchart of FIG. 9.

The control unit of the mobile phone 2 receives the signal to terminate the communication from the mobile phone 1 at step S31. Hereupon, it controls the non-contact wireless communications unit to terminate the non-contact wireless communication at step S32. Also, it stores the white card information received from the mobile phone 1 into the memory 23 at step S33 and terminates the entire process as illustrated in the flowchart of FIG. 9. Thereby, mutual white card information containing user name (nickname), comments, photo, and validity period has been exchanged between the mobile phone 1 and the mobile phone 2.

[Grouping Peers]

As described above, white card information is exchanged mutually between mobile phones by short range wireless communications. The control unit of each mobile phone manages received white card information on a peer-by-peer basis, wherein the management includes grouping other users' (peers') white card information received for a predetermined period of time.

Concretely, for example, suppose a case where the user of the mobile phone 1 gets acquainted with several persons (who are users in the present system) at a party and exchanges white card information with them via their mobile phones. The mobile phone 1 may receive one or more white cards for one or two hours during the party. When the mobile phone has received a white card, the control unit 24 of the mobile phone 1 registers the white card information to which it attaches the present time counted by the timer 20 as the receipt time into the memory 23. From the receipt time of each white card resisted in the memory 23, the control unit 24 detects white cards received for a predetermined period of one or two hours, based on the personal information exchanging program. The control unit 24 automatically assigns a same group identifier to the thus detected white cards.

As will be described later, the control unit 24 extracts, for example, photos from the white cards assigned a same group identifier and displays these photos together with the face photo of the user of the mobile phone 1 in a list which is referred to as a blue card on the display unit 13. As noted above, photos in the white cards are generally the face photos of the users (peers). When the blue card is displayed, thus, the face photos of the users (peers) with whom white cards have been exchanged for the predetermined period of time are displayed in a list along with the face photo of the user of the mobile phone 1.

With increasing opportunities of exchanging white cards, for example, at parties and banquets, it may be often difficult to remember when, where, and a person with whom white cards were exchanged. The system for exchanging personal information of the present embodiment is adapted such that other users (peers) with whom white cards have been exchanged for a predetermined period time are grouped in one group and the photos of their faces are displayed in a list. Hence, providing a view of the face photos of other users (peers) in a group helps the user of the mobile phone 1 to remember each peer with whom the user exchanged personal information mutually and to easily recall where and when the user exchanged personal information.

In this example, the control unit 24 of the mobile phone 1 automatically assigns a same group identifier to the white cards received for a predetermined period of time, thereby automatically grouping the users (peers) whose white cards have been received for the period of time. Alternatively, the user may perform a certain start action, for example, at the start of a party and a certain end action at the end of the party. The control unit 24 may automatically group the users (peers) whose white cards have been received from the time instant at which the start action was detected to the time instant at which the end action was detected. In the latter case as well, the same effect as described above can be obtained.

[Displaying Card Information]

Figure 10:
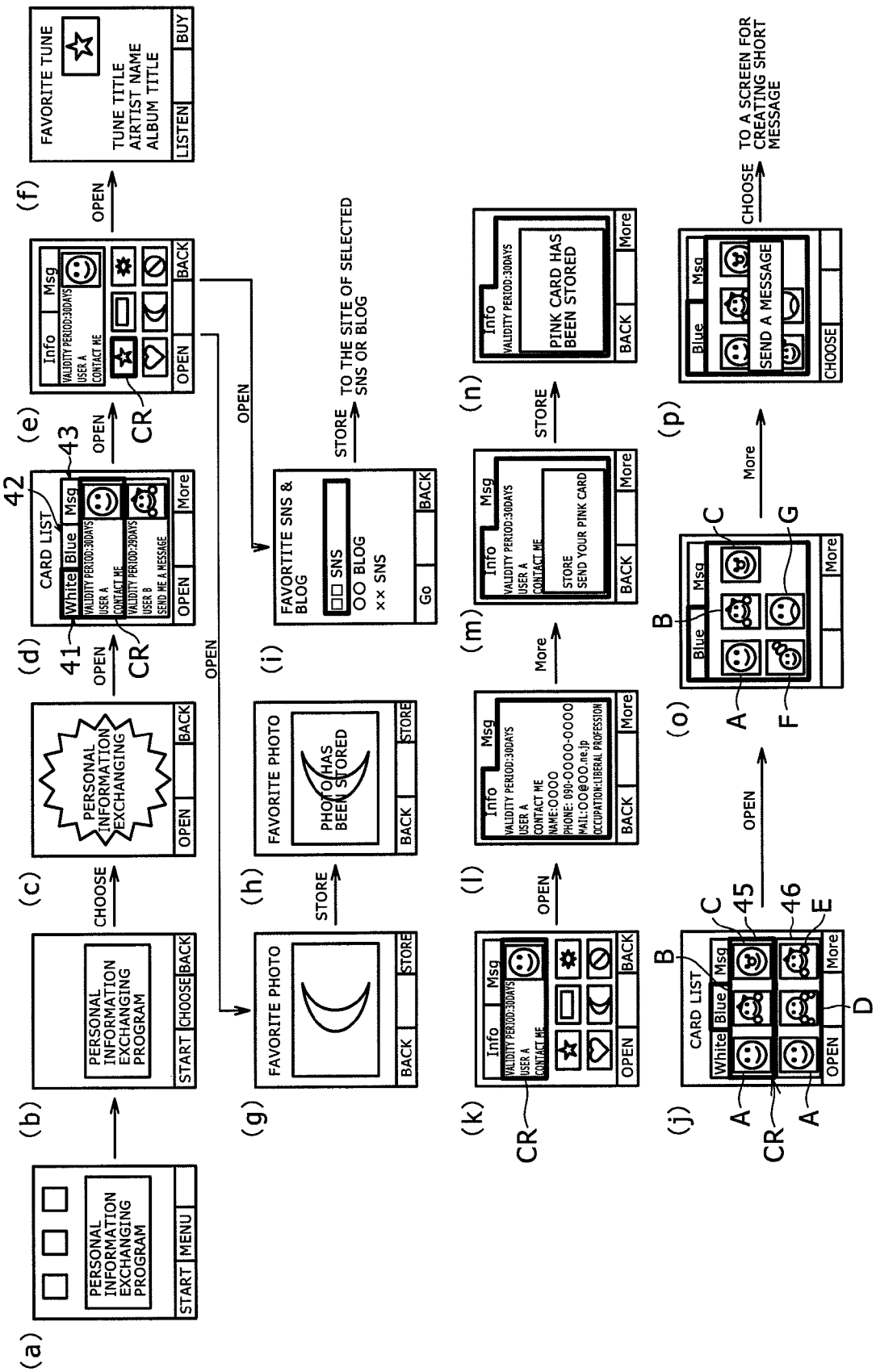
FIG. 10 illustrates operations of displaying a white card, a blue card, and a pink card on the mobile phone in the system for exchanging personal information of the exemplary embodiment.

White card information received from each peer and blue card information created by grouping white cards are displayed as follows. From a list of application programs shown in FIG. 10(*a*), first, when the user chooses the personal information exchanging program, as shown in FIG. 10(*b*), the control unit 24 of the mobile phone 1 displays the program name of the personal information exchanging program chosen by the user, as shown in FIG. 10(*c*), on the display unit 13.

Then, the user starts the personal information exchanging program. When the program is started, the control unit 24 displays a list of received white information in white card forms as a default, along with a white card tag 41 to bring up white card information, a blue card tag 42 to bring up blue card information, and a message tag 43 to bring up a short message received, which will be described later, as shown in FIG. 10(*d*), on the display unit 13, based on the personal information exchanging program.

(Displaying White Card Information)

When the user wants to view detailed information for a desired user's white card among the white cards displayed in the list, the user moves a cursor CR to the desired user's white card on the display through the operating unit 14 and brings up the white card information. When it is brought up, the control unit 24 displays the information contained in the white card at which the cursor CR is positioned and a list of its additional information, if exists, as shown in FIG. 10(*e*), on the display unit 13.

Figure 3:
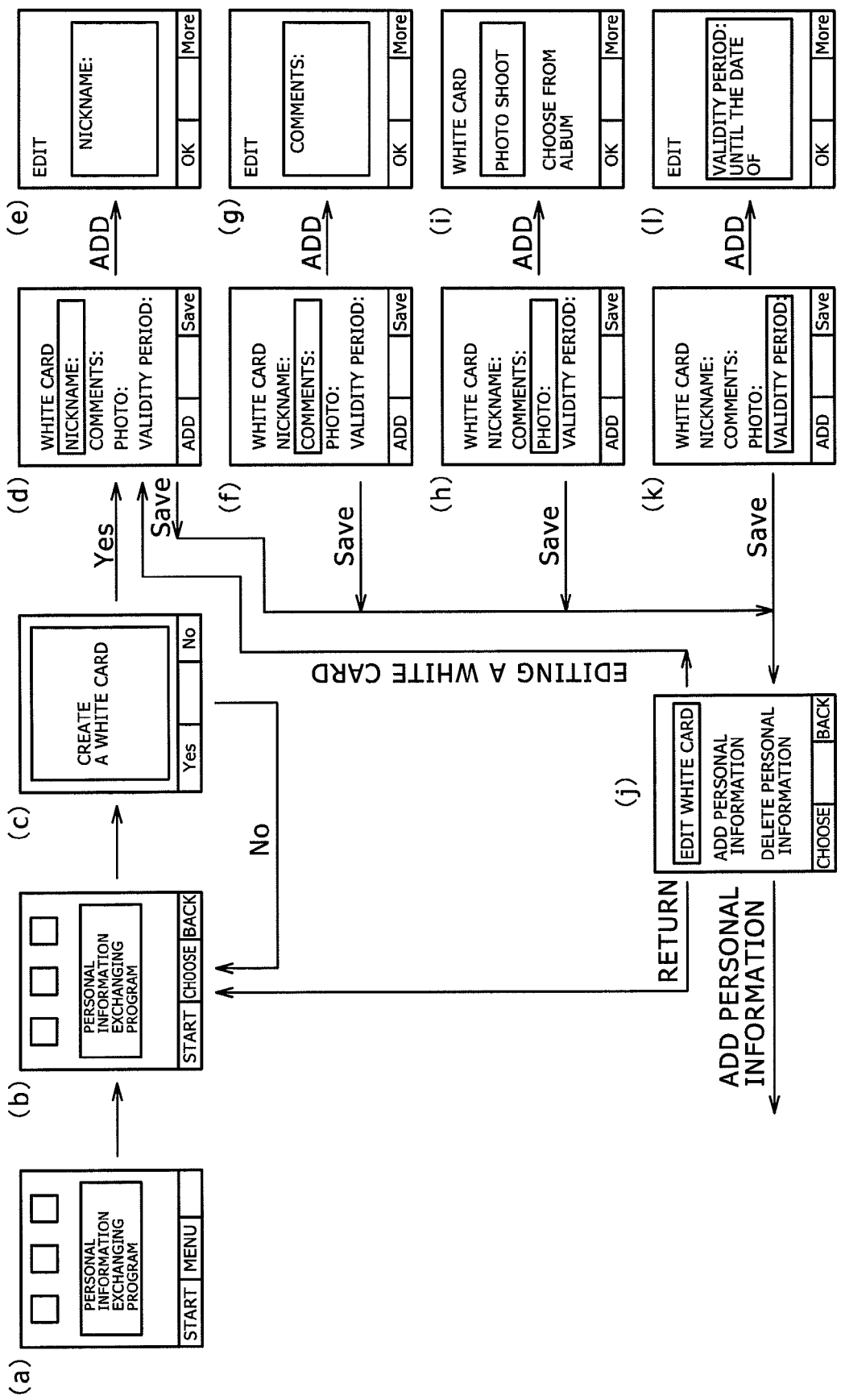
FIG. 3 illustrates an operation of creating a white card on a mobile phone used in the system for exchanging personal information of the exemplary embodiment.

In particular, the control unit 24 displays the white card information containing the user name, comments, photo (face photo), and validity period, as described with FIG. 3 in the upper half of the display area on the display unit 13 and additional information to the white card, if exists, in the lower half of the display area. The additional information may include favorite tunes described with FIG. 4, favorite photos described with FIG. 5, and user's blog and favorite SNS described with FIG. 6.

If the user wants to view further details of additional information thus displayed, the user moves the cursor CR to the position of desired additional information through operating unit 14 and brings up the additional information. When, for example, favorite tune additional information is chosen and brought up, the control unit 24 displays the tune title, artist name, album title, and album jacket photo of the favorite tune added to the white card as additional information, as shown in FIG. 10(*f*), on the display unit 13. Thereby, the user can know the favorite tune of the selected peer and might guess his or her interest, character, preference, etc.

In a case where music content for audition is added to a favorite tune, the control unit 24 assigns an audition function to enable the user to listen to the audition version of the tune to a certain button of the operating unit 14 and controls the display unit 13 to display the button to which the audition function is assigned on the display unit 13. Upon detecting the activation of the audition function button by the user, the control unit 24 reproduces the music content for the audition version of the tune from the memory 23 and outputs the music via the speaker 15 or the like.

In a case where th URL of a site on network where the tune can be purchased to a favorite tune, the control unit 24 assigns a purchase function to enables the user to purchase the tune to a certain button of the operating unit 14 and controls the display unit 13 to display the button to which the purchase function is assigned on the display unit 13. Upon detecting the activation of the purchase function button by the user, the control unit 24 causes access through the communication circuit 12 to a server on the network managing the URL attached to the favorite tune and displays information about purchasing the tune on the display unit 13. Thereby, the user may proceed to a procedure for purchasing the tune, according to the information about purchasing the tune displayed on the display unit 13.

With the white card of the selected user and its additional information being displayed as shown in FIG. 10(*e*), when the user chooses and brings up favorite photo additional information, the control unit 24 displays the favorite photo as the additional information on the display unit 13, scaling it to the display screen size, as shown in FIG. 10(*g*). Thereby, the user can view the favorite photo of the selected peer and might guess his or her interest, character, preference, etc. If the user saves the photo thus displayed, the control unit 24 stores the photo being now displayed on the display unit 13 (the photo added as additional information to the white card of the selected user) into the memory 23.

With the white card of the selected user and its additional information being displayed as shown in FIG. 10(*e*), when the user chooses and brings up blog and favorite SNS additional information, the control unit 24 displays a list of the names of blogs and SNSs included in the additional information, as shown in FIG. 10(*i*), on the display unit 13. Thereby, the user can know the blogs used by the peer having the white card and the peer's favorite SNSs.

Figure 6:
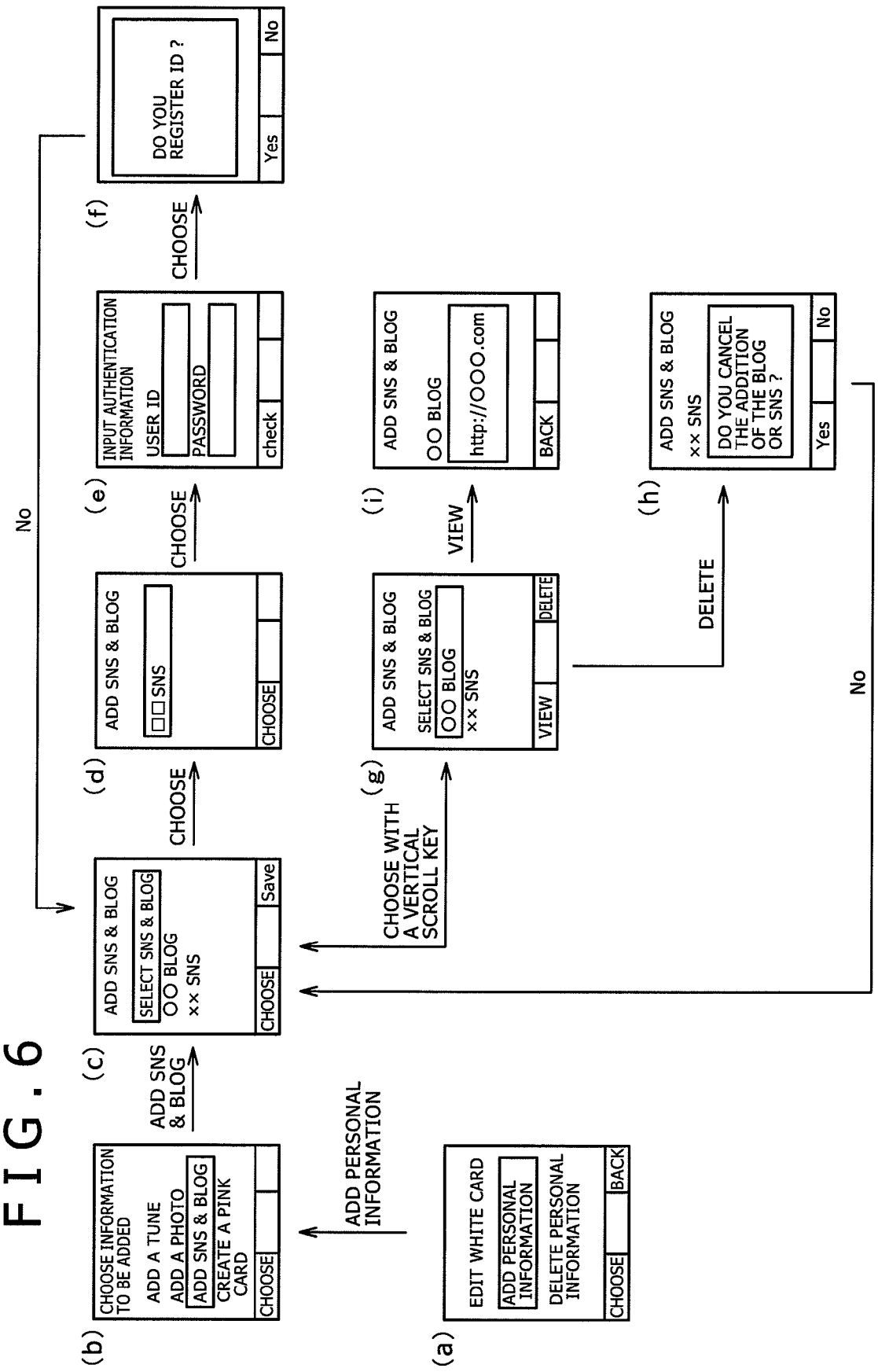
FIG. 6 illustrates an operation of adding a user's blog and favorite SNS which are added as additional information to the white card created on a mobile phone used in the system for exchanging personal information of the exemplary embodiment.

As described with FIG. 6, if blog and SNS additional information exists, the URL of each blog or SNS and user ID and password for login are also added as the additional information. Thus, when the user selects a desired blog or SNS name in the blog and SNS list displayed and requests access to it, the control unit 24 causes access through the communication circuit 12 to a server on the network managing the URL of the selected blog or SNS and performs a login using the user ID and password. Then, the control unit 24 displays the information for the blog used by the peer having the white card or the peer's favorite SNS on the display unit 13. Thereby, the user can view or browse the blog used by the peer having the white card or the peer's favorite SNS.

(Displaying Pink Card Information)

White cards containing simple personal information are first exchanged and, in most cases, it is desirable to exchange pink cards containing detailed information after a mutual confidential relationship is established. However, the user may optionally send pink card information along with a white card when sending the white card information, as described with FIG. 7(*i*) and FIG. 7(*p*). In this case, the control unit 24 stores the white card information associated with the pink card information transmitted with the white card into the memory 23. After white cards are exchanged with a peer, when pink card information is later received from the peer user, the control unit 24 stores the later received pink card information into the memory 23, associated with the white card information registered with a previous date on the memory 23, which will be detailed later. Hence, white cards displayed in a list as shown in FIG. 10(*d*) include those accompanied with pink card information.

When a white card is brought up from the list shown in FIG. 10(*d*), if a pink card associated with the white card exits, the control unit 24 of the mobile phone 1 displays the white card information containing the user name, comments, photo (face photo), and validity period in a pink card form in the upper half of the display area on the display unit 13 and additional information, if attached to the white card, in the lower half of the display area, as shown in FIG. 10(*k*). The additional information may include favorite tunes described with FIG. 4, favorite photos described with FIG. 5, and user's blog and favorite SNS described with FIG. 6. In other words, the control unit 24 displays white card information in a pink card form, if an associated pink card exists; if not, the white card information is displayed in a white card form. Thereby, the user can recognize that a pink card exists associated with the white card information.

When the user brings up further details on the white card information displayed in a pink card form, the control unit 24 reads the pink card information stored associated with the white card information from the memory 23 and displays it, as shown in FIG. 10(*l*), on the display unit 13. Thereby, as described with FIG. 7(*c*) to FIG. 7(*o*), detailed personal information such as phone number, e-mail address, occupation, and birth date of the peer with whom the user exchanged white card information is displayed on the display unit 13.

With the pink card information being displayed, when the user brings up a menu for further processing, the control unit 24 displays a store menu to store the displayed pink card information and a send pink card menu to send the pink card of the user of the mobile phone 1 to the peer having the displayed pink card, as shown in FIG. 10(*m*), on the display unit 13.

If the user chooses the store menu, the control unit 24 stores the pink card information displayed on the display unit 13 and displays a message indicating that storing has been executed, e.g., "Pink card has been stored", as shown in FIG. 10(*n*), on the display unit 13. If the user chooses the send pink card menu, the control unit 24 operates to send the pink card of the user of the mobile phone 1 registered on the memory 23 to the mobile phone of the peer user, which will be detailed later.

(Displaying Blue Card Information)

With the white card tag 41, blue card tag 42, and message tag 43 appearing on the display unit 13, shown in FIG. 10(*d*), when the user chooses the blue card tag 42 through the operating unit 14, the control unit 24 displays blue card information in a simple form. As described above, the blue card information has been created by grouping white cards received for a predetermined period of time or grouping white cards received from the user start action to end action.

FIG. 10(*j*) gives an example of this display of blue card information in a simple form. As shown in FIG. 10(*j*), when displaying blue card information in a simple form, the control unit 24 detects a first peer from which white card information was received first in time sequence and a second peer from which white card information was received secondly in time sequence, based on the receipt times attached to the white cards of the peers in the group. Then, the control unit 24 detects the respective face photos attached to the white cards of the first and second peers and displays the two face photos in order at the side of the face photo of the user of the mobile phone 1.

FIG. 10(*j*) gives an example where the blue card of a first group 45 and the blue card of a second group 46 are displayed. The appearing blue card of the first group 45 includes the face photo of the user A of the mobile phone 1 and the face photos of peer B and peer C in the first group. The appearing blue card of the second group 46 includes the face photo of the user A of the mobile phone 1 and the face photos of peer D and peer E in the second group 46.

If one group is made up of only one peer, the control unit 24 displays the face photo attached to the white card of the peer at the side of the face photo of the user of the mobile phone 1. In this case, only two face photos appear in the blue card.

On the other hand, if one group is made up of three or more peers, the control unit 24 randomly detects two out of the three or more peers and displays the respective face photos attached to the white cards of the two peers in order at the side of the face photo of the user of the mobile phone 1. When blue card information in a simple form is displayed, for example, the size of the display area limits the face photos to appear per group to three. However, by displaying the face photos of thus randomly detected peers in a group, it is possible with a high probability to change peers whose phase photos will appear in the group, each time blue card information in a simple form is displayed.

Thus, such a blue card display can help the user of the mobile phone 1 to recall when and where white cards were exchanged. Even if one group is made up of three or more peers, the face photos of two peers from which white card information was received first and secondly in time sequence, as described above, may be displayed in order at the side of the face photo of the user of the mobile phone 1. In the above description, when blue card information in a simple form is displayed, the face photos of three persons per group are displayed. Alternately, the face photos of, for example, four or five persons per group may be displayed. Although, in the above description, the appearing face photos of the persons per group in a blue card display includes the face photo of the user of the mobile phone 1, the face photo of the user of the mobile phone 1 may be excluded from the blue card display.

In the example of FIG. 10(*j*), the face photos of three persons (two peers and the user of the mobile phone 1) are selectively displayed per group. However, in some cases, three or more peers may be included in the group, as noted above. In the system for exchanging personal information of the present embodiment, it is possible to send a short message to all peers in a group.

Thus, if the user of the mobile phone 1 wants to know further details of a desired group or wants to send a short message to all peers in the group, the user moves the cursor CR to the desired blue card and brings up its detailed information. When this is done, the control unit 24 detects the face photos from the white cards of all peers in the group selected by the user and displays these face photos along with the face photo of the user of the mobile phone 1 in a list, as shown in FIG. 10(*o*), on the display unit 13.

This example of FIG. 10(*o*) is a case where the face photos of all peers in the first group 45 are displayed. In this case, the first group 45 is made up of peer B, peer C, peer F, and peer G. While only the phase photos of peers B and C appear along with the face photo of the user A of the mobile phone 1 in a simple form of blue card display shown in FIG. 10(*j*), the display of detailed blue card information brought up includes the face photos of user A of the mobile phone as well as the peers B, C, F, and G. Thereby, the user of the mobile phone 1 can recognize all peers in the group and this display can help the user of the mobile phone 1 to recall when and where white cards were exchanged.

If the first group 45 is made up of only two peers B and C, the control unit 24 displays the face photos of three persons, the user A of the mobile phone 1 and the peers B and C, in the display of detailed blue card information as in the case of FIG. 10(*j*). If one group is made up of many peers and the face photos of all peers are not displayed at a time in the displace area on the display unit 13, the control unit 24 first displays the face photos of six persons which are displayable and a scroll bar. Using the scroll bar, the face photos of the peers appearing can be changed optionally.

To send a short message to all peers in the group appearing in such a detailed display, the user brings up a menu for further processing at the appearing display screen shown in FIG. 10(*o*). When the menu is brought up, the control unit 24 displays a menu to create a short message, as shown in FIG. 10(*p*), on the display unit 13. When the user chooses the menu to create a short message, the control unit 24 displays a screen for creating a short message on the display unit 13.

[Sending a Short Message]

In the system for exchanging personal information of the present embodiment, it is possible to send a short message or a pink card having detailed personal information to a peer with whom the user exchanged white cards.

(Sending to a Peer with Whom the User Exchanged White Cards)

Figure 11:
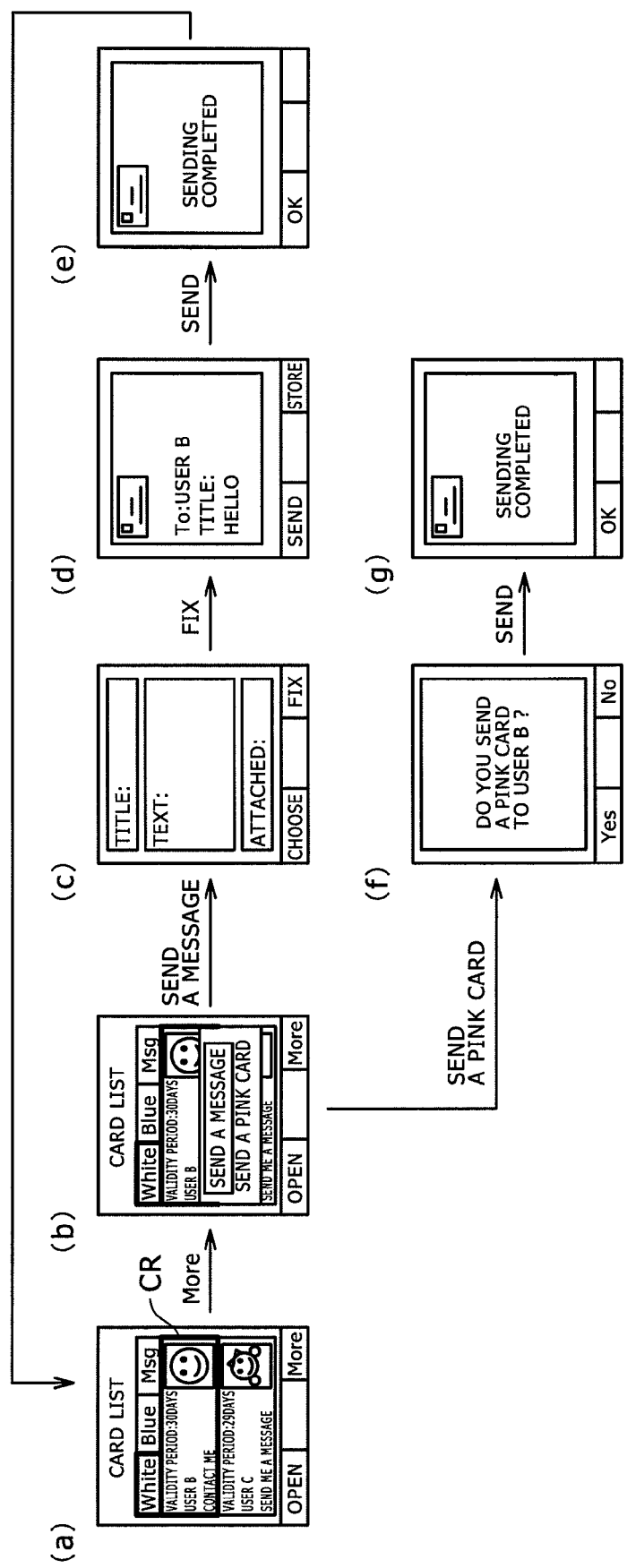
FIG. 11 illustrates an operation of creating and sending a short message based on a white card in the system for exchanging personal information of the exemplary embodiment.

FIG. 11(*a*) to FIG. 11(*e*) illustrates a flow of sending a short message to a peer with whom the user exchanged white cards, based on the white card information of the peer. In this case, at the display screen in which white cards received from peers appear, as shown in FIG. 11(*a*), the user of the mobile phone 1 moves the cursor CR to the white card of a peer to which a short message should be sent and brings up a menu for further processing. When this is done, the control unit 24 displays a "send a short message" menu and a "send a pink card" menu, as shown in FIG. 11(*b*), on the display unit 13.

When the user chooses the "send a short message" menu, the control unit 24 displays a screen for creating a short message, including the entry fields for, for example, title, text, and attached files, as shown in FIG. 11(*c*), on the display unit 13. The user enters a desired title, message, etc. in these fields, for example, as shown in FIG. 11(*d*), and requests sending.

When the sending is requested, the control unit 24 attaches the user ID attached to the white card of the peer at which the cursor CR is positioned, as shown in FIG. 11(*a*), and the user ID of the user of the mobile phone 1 issued from the server device 3 when the user was registered, as described above, to the short message created.

The control unit 24 thus attaches the peer user ID and the user ID of the user of the mobile phone 1 to the short message, wherein at least the peer user ID is inhibited from being displayed (the peer user ID attached to the short message is hidden). In creating a short message, thereby, the peer user ID is not known to the user of the mobile phone 1, so that the peer user's personal information can be protected.

When the short message is thus created, the control unit 24 controls the communication circuit 12 to transmit the short message to the URL of the server device 3, using a short message TX/RX function 35, shown in FIG. 1, according to the personal information exchanging program. Upon the completion of sending the short message, the control unit 24 displays a message indicating that the short message sending is complete, e.g., "sending the short message completed", as shown in FIG. 11(*e*), on the display unit 13. Thereby, the user of the mobile phone 1 can recognize that the short message has been sent to the peer user selected by the user.

Figure 12:
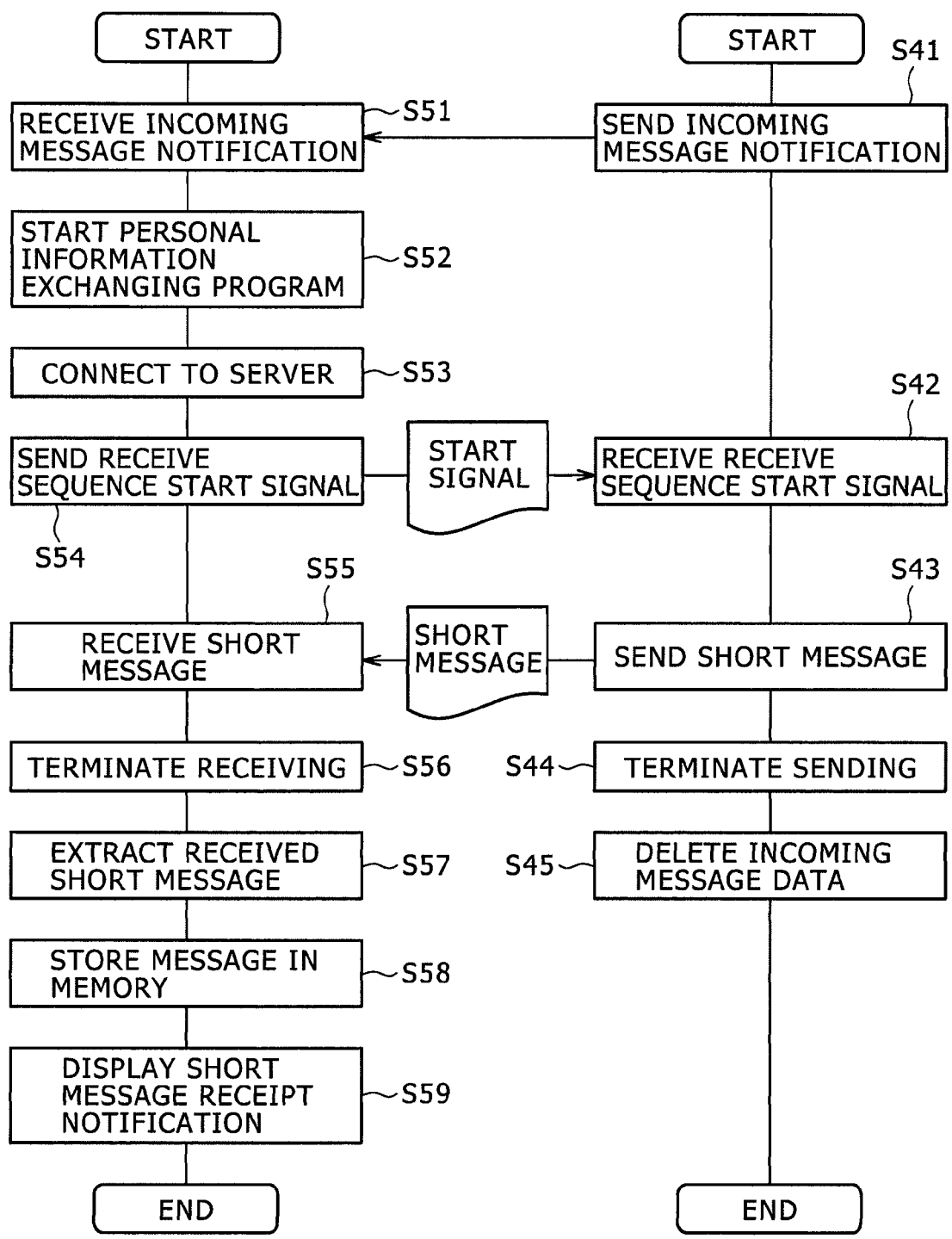
FIG. 12 is a flowchart illustrating a flow of receiving a short message via a server device in the system for exchanging personal information of the exemplary embodiment.

Then, the thus sent short message is received by the mobile phone 2 of the peer user, according to a flow which is illustrated in FIG. 12. In the flowchart of FIG. 12, steps S41 to S44 represent a sending operation flow at the server device 3 and steps S51 to S58 represent a receiving operation flow at the mobile phone 2.

Upon receiving the short message, the control unit 8 of the server device 3 shown in FIG. 1 first performs user authentication by referring to ID management database 7, based on the user ID of the user of the mobile phone 1 and the user ID of the peer user attached to the short message, in step S41 of the flowchart of FIG. 12. If both the user of the mobile phone 1 and the peer user have been authenticated as valid users of the system for exchanging personal information, the control unit 8 stores the received short message into the message DB 6, retrieves an e-mail address of the peer user (in this case, e-mail address of the user of the mobile phone 2) which is stored associated with the user ID of the peer user in the ID management database 7, and sends an incoming message notification to indicate that the server device 3 has an incoming short message addressed to the peer, e.g., "a short message has arrived" to the e-mail-address.

The control unit of the mobile phone 2 to which the short message should be forwarded receives the incoming message notification sent from the server device 3 at step S51. Then, the control unit starts the personal information exchanging program stored on the memory at step S52 and displays the above incoming message notification on the display unit, based on the personal information exchanging program, Viewing the incoming message notification, the user of the mobile phone 2 activates receiving of the short message through the operating unit. When receiving of the short message is activated, the control unit controls the communication circuit to access the server device 3 at step S53 and send a receive sequence start signal to the server device 3 at step S54.

When the control unit of the server device 3 receives the receive sequence start signal at step S42, the control unit of the server device 3 sends the short message stored in the message DB 6 to the mobile phone 2. Then, the control unit terminates the sending operation such as disconnecting the communication channel to the mobile phone 2 at step S44, deletes the transmitted short message from the message DB 6 at step S45, and terminates the entire process as illustrated in the flowchart of FIG. 12.

On the other hand, the control unit of the mobile phone 2 receives the short message transmitted from the server device 3 at step S55 and terminates communication such as disconnecting the communication channel to the server device 3 at step S56. The control unit stores the received short message at steps S57 and S58 and displays a short message receipt message, e.g., "short message has been received" on the display unit at step S59, then terminates the entire process as illustrated in the flowchart of FIG. 12.

In this way, sending a short message from the mobile phone 1 to the server device 3 is performed, based on the URL of the server device 3, wherein the peer user ID remains concealed. Sending the short message from the server device 3 to the peer mobile phone 2 is performed, based on the e-mail address of the peer user maintained on the server device 3. Hence, the short message can be transmitted and received without revealing the e-mail address of the peer to the user of the mobile phone 1, so that the peer user's personal information can be protected.

(Sending a Short Message to all Peers in a Blue Card)

As described with FIG. 10(*j*), FIG. 10(*o*), and FIG. 10(*p*), when the user selects a desired group and chooses the menu to create a short message, the control unit 24 displays the screen for creating a short message, including the entry fields for, for example, title, text, and attached files, as shown in FIG. 11(*c*), on the display unit 13. The user enters a desired title, message, etc. in these fields, for example, as shown in FIG. 11(*d*), and requests sending.

When the sending is requested, the control unit 24 attaches all the user IDs respectively attached to the white cards of all the peers in the group selected by the user, as shown in FIG. 10(*o*) and FIG. 10(*p*), and the user ID of the user of the mobile phone 1 issued from the server device 3 when the user was registered, as described above, to the short message created, wherein these user IDs are concealed as noted above.

When the short message is thus created, the control unit 24 controls the communication circuit 12 to transmit the short message to the URL of the server device 3, using the short message TX/RX function 35, shown in FIG. 1, according to the personal information exchanging program. Upon the completion of sending the short message, the control unit 24 displays a message indicating that the short message sending is complete, e.g., "sending the short message completed", as shown in FIG. 11(*e*), on the display unit 13. Thereby, the user of the mobile phone 1 can recognize that the short message has been sent to the peer users selected by the user.

Upon receiving the short message, the control unit 8 of the server device 3 shown in FIG. 1 performs user authentication by referring to ID management database 7, based on the user ID of the user of the mobile phone 1 and the user IDs of all the peers in the group attached to the short message. If the user of the mobile phone 1 and the peers in the group have been authenticated as valid users of the system for exchanging personal information, the control unit 8 stores the received short message into the message DB 6, retrieves respective e-mail addresses of the peers in the group, stored associated with the user IDS of the peers in the group in the ID management database 7, and sends an incoming message notification respectively to these e-mail-addresses, as described with the flowchart of FIG. 12. In response to a request to send a short message issued from the mobile phone of each peer having received this incoming message notification, the server forwards the short message sent from the user of the mobile phone 1, stored in the message DB 6, to each peer's mobile phone. Thereby, a short message can be transmitted to all the peers in the group.

Even when a short message is sent to all peers in a desired group in this way, sending the short message from the mobile phone 1 to the server device 3 is performed, based on the URL of the server device 3, wherein the user IDs of the peers remain concealed. Sending the short message from the server device 3 to the peers in the group is performed, based on the e-mail addresses of the peers maintained on the server device 3. Hence, even when a short message is sent to all peers in a desired group, the short message can be transmitted and received without revealing the e-mail addresses of the peers to the user of the mobile phone 1, so that personal information of each peer in the group can be protected.

(Sending a Pink Card)

FIG. 11(*f*) and FIG. 11(*g*) illustrate a flow of sending a pink card containing detailed personal information of the user of the mobile phone 1, based on peer's white card information. In this case, the user of the mobile phone 1 selects a white card of a peer to which a pink card should be sent from the white card list displayed as shown in FIG. 11(*a*) by moving the cursor CR to the white card. Then, at the display screen in which the "send a short message" menu and the "send a pink card" menu appearing, as shown in FIG. 11(*b*), on the display unit 13, the user chooses the "send a pink card" menu. When the "send a pink card" menu is chosen, the control unit 24 detects the user name of the peer having the white card selected by the cursor CR. Then, the control unit 24 displays a message asking if the user sends a pink card to the peer user detected from the white card, e.g., "Do you send a pink card to user B?", as shown in FIG. 11(f), on the display unit 13.

In response to this message, when a user action that accepts sending a pink card occurs, the control unit 24 reads the pink card information of the user of the mobile phone 1 from the memory 23. Then, the control unit 24 attaches the user ID attached to the peer's white card selected by the cursor CR and the user ID of the user of the mobile phone 1 to the pink card and controls the communication circuit 12 to send it to the server device 3. Both user IDs are thus attached to the pink card, wherein at least the user ID of the peer to which the pink card should be sent remains concealed to the user of the mobile phone 1, as noted above. Upon the completion of sending this pink card, the control unit 24 displays a message indicating that the pink card sending is complete, e.g., "Sending the pink card completed", as shown in FIG. 11(g), on the display unit 13. Thereby, the user of the mobile phone 1 can recognize that the pink card has been sent to the peer user selected by the user.

Upon receiving the pink card, the control unit 8 of the server device 3 shown in FIG. 1 performs user authentication by referring to ID management database 7, based on the user ID of the user of the mobile phone 1 and the user ID of the peer attached to the pink card. If both have been authenticated as valid users of the system for exchanging personal information, the control unit 8 stores the received pink card into the message DB 6, retrieves an e-mail address of the peer, stored associated with the user ID of the peer in the ID management database 7, and sends an incoming message notification to the e-mail-address, as described with the flowchart of FIG. 12. In response to a request to send a pink card issued from the mobile phone of the peer having received this incoming message notification, the server forwards the pink card sent from the user of the mobile phone 1, stored in the message DB 6, to the peer's mobile phone. Thereby, a pink card contained detailed personal information can be sent to a desired peer selected among peers with whom the user exchanged white cards (detailed personal information can be revealed only to the desired peer).

Sending the pink card from the mobile phone 1 to the server device 3 is performed, based on the URL of the server device 3, wherein the user ID of the peer remains concealed. Sending the pink card from the server device 3 to the peer's mobile phone 2 is performed, based on the e-mail address of the peer maintained on the server device 3. Hence, the pink card can be transmitted and received without revealing the e-mail address of the peer to the user of the mobile phone 1, so that personal information of the peer user can be protected.

(Sending Additional Information)

To establish a confidential relationship between users who met for the first time safely, it is desirable to do it in a level-wise fashion, such that simple personal information is exchanged to introduce your interest, preference, etc. to the peer gradually and detailed personal information is exchanged after a certain level of confidence is attained. In the system for exchanging personal information of the present embodiment, first, exchanging only white cards containing user name (nickname), comments, photo, and validity period is performed. At the next level, favorite tunes and photos, etc. are introduced as the above-described additional information. If a confidential relationship is thereby established, exchanging pink cards containing detailed personal information is performed. In this way, it is possible to establish a confidential relationship between users who met for the first time safely and in a level-wise fashion. Exchanging additional information may be performed when white cards are first exchanged by adding this information to a white card. In the system for exchanging personal information of the present embodiment, additional information can also be exchanged by attaching it to the short message.

Figure 13:
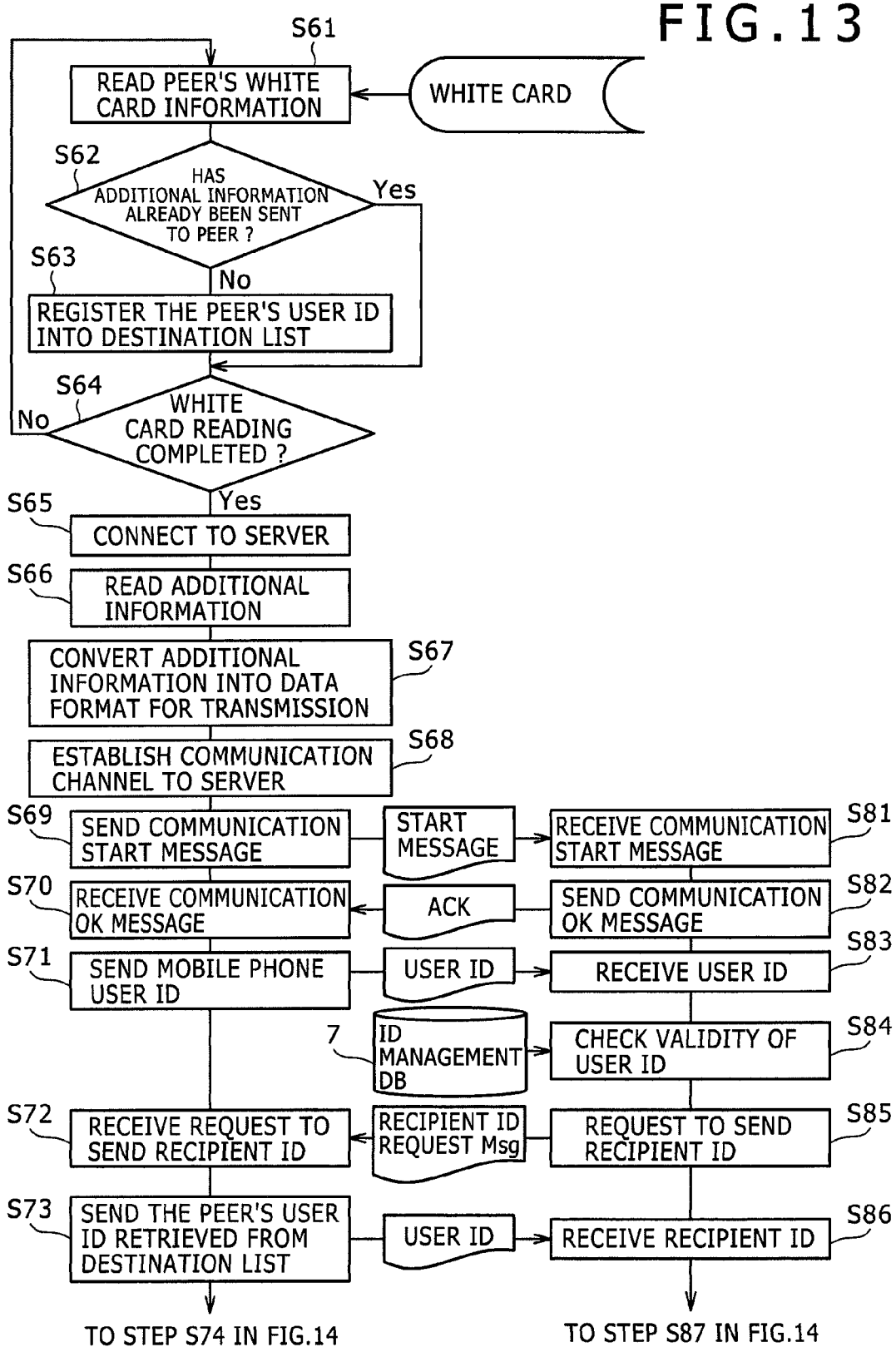
FIG. 13 is a flowchart illustrating a first part of a process flow of sending additional information attached to a short message in the system for exchanging personal information of the exemplary embodiment.
Figure 14:
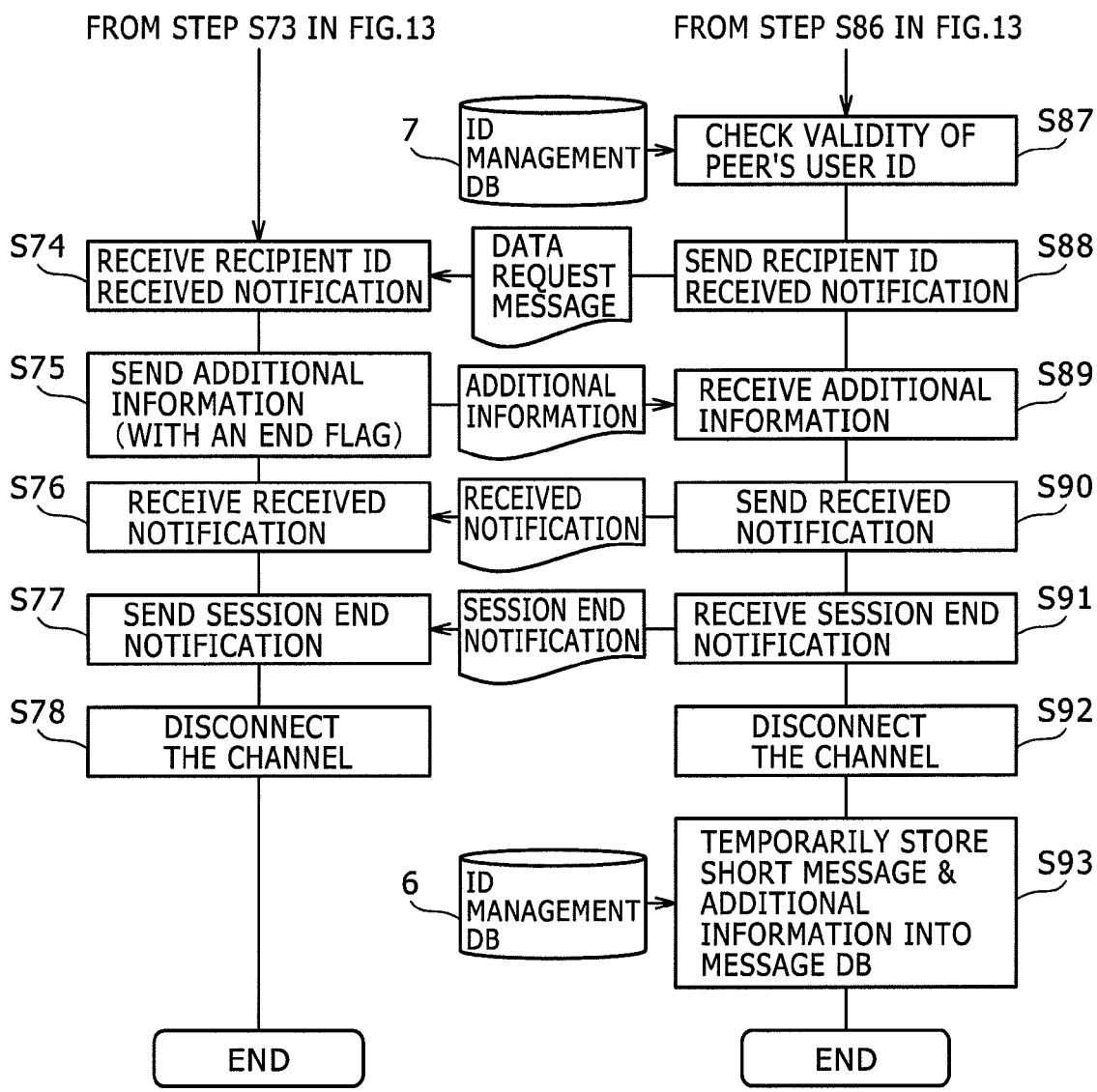
FIG. 14 is a flowchart illustrating the remaining part of the process flow of sending additional information attached to a short message in the system for exchanging personal information of the exemplary embodiment.

A flowchart of FIG. 13 illustrates a first part of a process flow for exchanging "additional information" such as favorite tunes and photos after exchanging white cards in the system for exchanging personal information. FIG. 14 illustrates the remaining part of the process flow. In the flowcharts of FIGS. 13 and 14, steps S61 to S78 represent a process flow that is performed by the control unit 24 of the mobile phone 1 and steps S81 to S93 represent a process flow that is performed by the control unit 8 of the server device 3.

Figure 4:
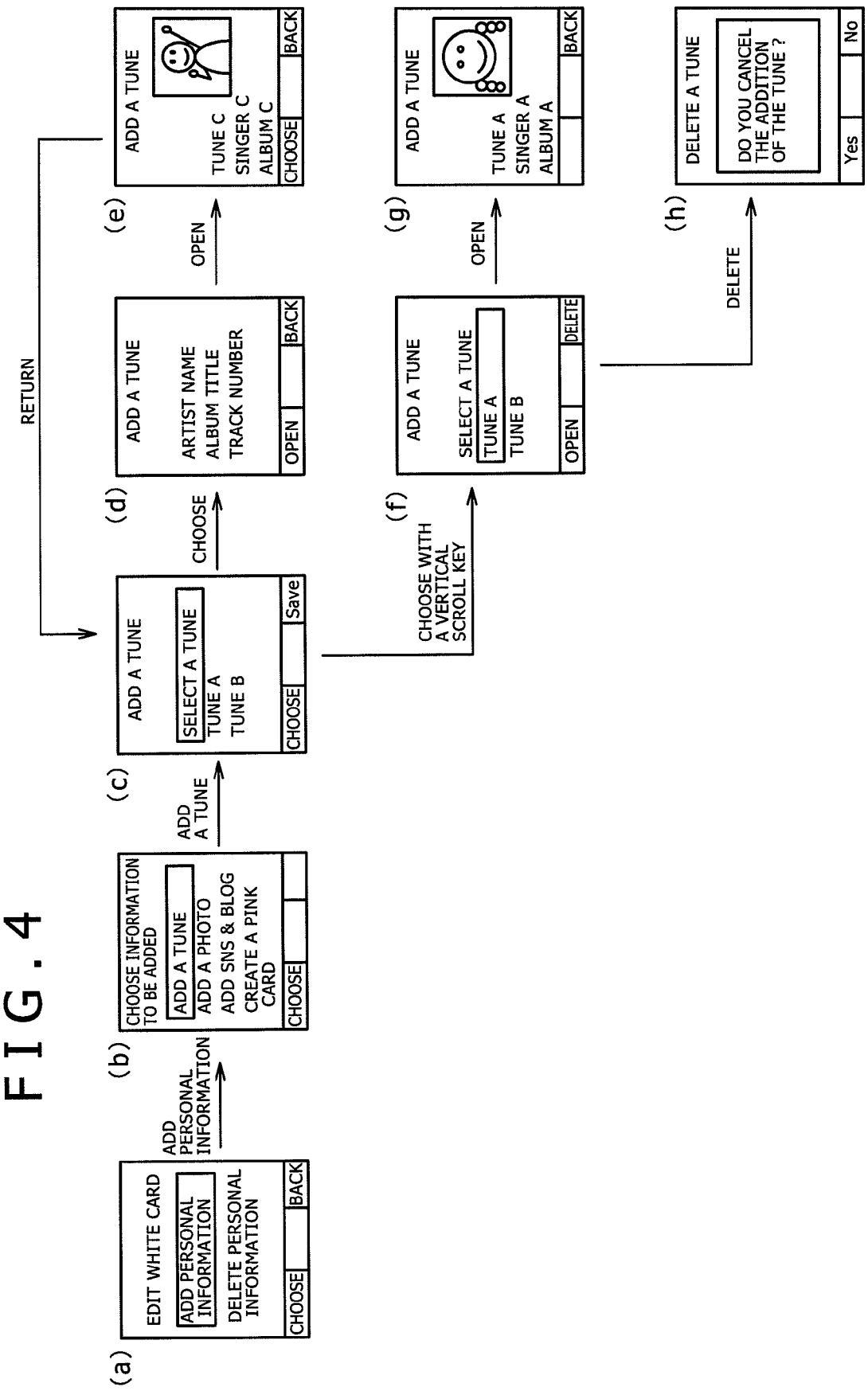
FIG. 4 illustrates an operation of adding a favorite tune which is added as additional information to the white card created on a mobile phone used in the system for exchanging personal information of the exemplary embodiment.
Figure 5:
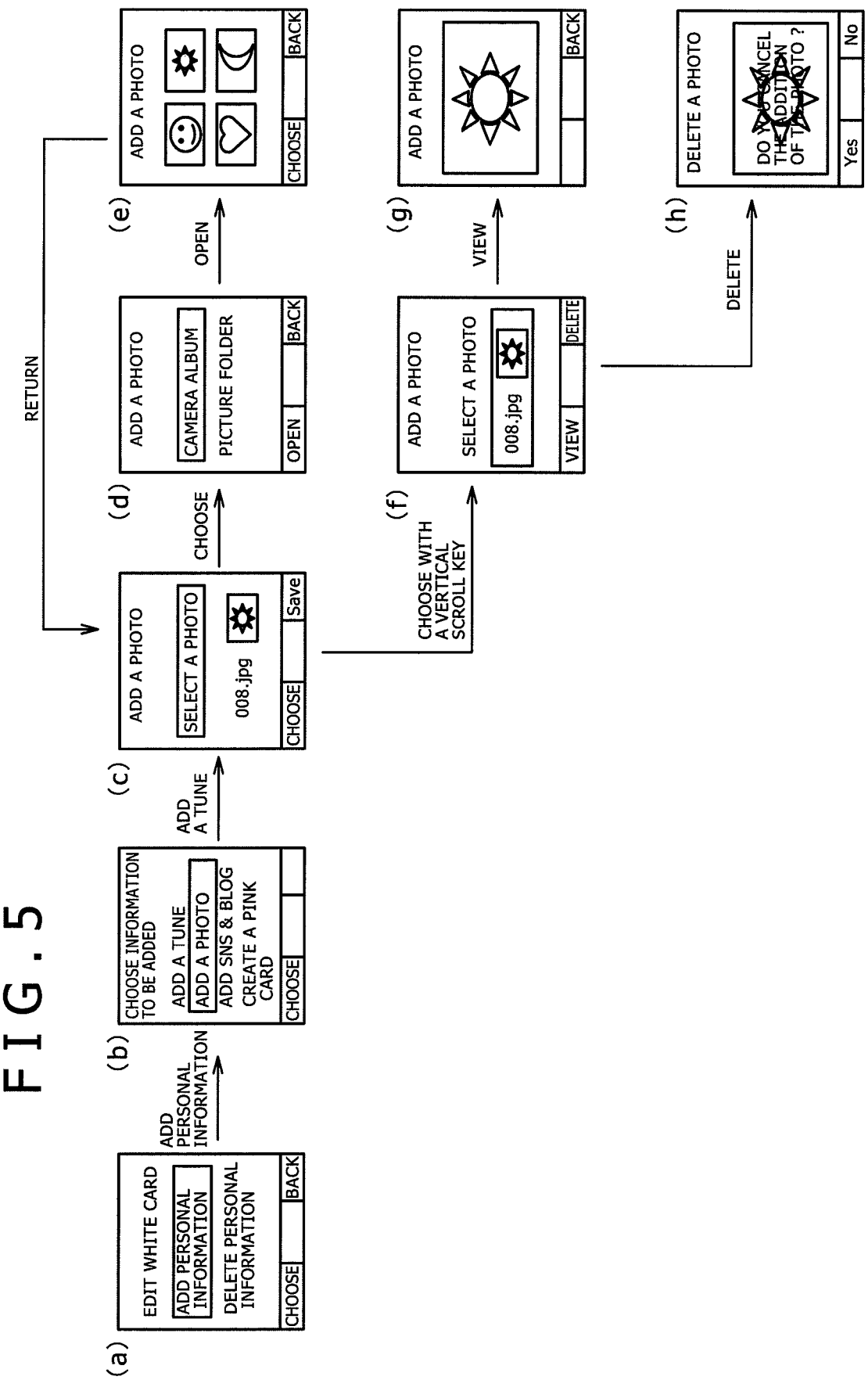
FIG. 5 illustrates an operation of adding a favorite photo which is added as additional information to the white card created on a mobile phone used in the system for exchanging personal information of the exemplary embodiment.

When the user of the mobile phone 1 sends addition information, in particular, the user selects one or more items of addition information to be sent to the peer from among "favorite tunes", "favorite photos", and "user's blog and SNS used by the user" described with FIGS. 4 to 6, specifies the selected items as attached files to the short message in the screen for creating a short message shown in FIG. 11(c), and requests sending.

When the sending is requested, at step S61, the control unit 24 of the mobile phone 1 reads the white card information of the peer to which the additional information should be sent, that is, the peer having the white card at which the cursor CR is positioned, as described with FIG. 11(a), and proceeds t step S62. At step S62, the control unit 24 determines whether additional information has already been sent to peer having the white card. If additional information has already been sent, at step S64, the control unit 24 waits for completion of reading of the white card information of the peer to which the additional information should be sent and proceeds to step S65. If, as determined at step S62, additional information has not been sent to the peer to which additional information should be sent, at step S63, the control unit 24 registers the user name and user ID of the peer to which the additional information should be sent into the destination list stored on the memory 23 shown in FIG. 2. At step S64, the control unit 24 waits for completion of reading of the white card information of the peer to which the additional information should be sent and proceeds to step S65.

After acquiring white card information by exchanging white cards, sending additional information and the like to the peer having the white card information involves a possibility of sending additional information and/or a pink card to the peer in future. Thus, when sending additional information (or a pink card) (at the first access to a peer after exchanging white cards with the peer), the control unit 24 registers the user name and user ID of the peer that is accessed into the destination list on the memory 23.

The control unit 24 displays this destination list on the display unit 13, when the user of the mobile phone 1 brings up this list. When the destination list is displayed on the display unit 13, the control unit 24 displays only the user name of each peer on the display unit, but hides the user ID of each peer, as noted above, thereby protecting personal information of each peer. When the user of the mobile phone 1 selects a desired peer from the destination list displayed and chooses the menu to create a short message, the control unit 24 displays a screen for creating a short message addressed to the user name of the peer selected from the destination list on the display unit 13. Thus, the user of the mobile phone 1 does not need to specify the recipient of the short message. Likewise, when the user of the mobile phone 1 selects a desired peer from the destination list displayed and chooses the menu to send a pink card, the control unit 24 attaches the user ID of the peer selected from the destination list to the pink card of the user of the mobile phone 1 and sends the pink card to the server device 3. Thereby, the user of the mobile phone 1 can send a pink card only by a simple operation such as selecting a desired peer from the destination list.

After registering the user name and user ID into the destination list, at step S65, the control unit 24 controls the communication circuit 2 to establish a communication channel to the server device 3. At step S66, the control unit 24 reads additional information specified by the user of the mobile phone 1 from the memory 23 among additional information such as favorite tunes and photos stored attached to the white card of the user of the mobile phone 1 and proceeds to step S67. At step S67, the control unit 24 converts the additional information read from the memory 23 into a predefined data format for transmission and proceeds to step S68.

At step S68, the control unit 24 makes sure that a communication channel has been established between the mobile phone 1 and the server device 3 and proceeds to step S69 where the mobile phone sends a communication start message to the server device 3.

The control unit 8 of the server device 3 receives the communication start message transmitted from the mobile phone 1 at step S81 and sends back a communication OK message (ACK (Acknowledge) signal) to accept communication to the mobile phone 1 at step S82. The control unit 24 of the mobile phone 1 receives the communication OK message at step S70 and sends the user ID (user ID of the user of the mobile phone 1) issued from the server device 3 when the user was registered, as described above, to the server device 3 at step S71. The control unit 8 of the server device 3 receives the user ID at step S83 and performs user authentication of the user of the mobile phone 1 by referring to the ID management DB 7 at step S84. The control unit 8 of the server sends a recipient ID request message to request the mobile phone to send the user ID of the peer that is the recipient of the short message (in this case, the recipient of additional information attached to the short message as attached files) to the mobile phone 1 at step S85.

When the control unit 24 of the mobile phone 1 receives the recipient ID request message at step S72, it sends the user ID of the peer that is the recipient of the additional information, retrieved from the destination list, to the server device 3 at step S73. The control unit 8 of the server device 3 receives the user ID of the peer that is the recipient of the additional information at step S86. The control unit 8 performs user authentication of the peer that is the recipient by referring to the ID management DB 7 at step S87 in the flowchart of FIG. 14. Then, the control unit 8 sends a recipient ID received notification message indicating that the server received the ID of the recipient peer to which the additional information should be sent to the mobile phone 1 at step S88.

At step S74 in the flowchart of FIG. 14, the control unit 24 of the mobile phone 1 receives the recipient ID received notification message. At step S75, the control unit 24 sends the short message and additional information attached thereto with an end flag indicating the end of data to the server device 3. The control unit 8 of the server device 3 receives the short message and additional information at step S89. Upon detecting the end flag indicating the end of the data, the control unit 8 sends a received notification message to the mobile phone 1 at step S90.

When the control unit 24 of the mobile phone 1 receives the received notification message at step S76, it sends a communication end message to the server device 3 at step S77, disconnects the communication channel at step S78, and terminates the entire process illustrated in the flowcharts of FIGS. 13 and 14.

When the server device 3 receives the communication end message at step S91, it disconnects the communication channel at step S92, temporarily stores the short message and additional information into the message DB 6 at step S93, and terminates the entire process illustrated in the flowcharts of FIGS. 13 and 14. After temporarily storing the short message and additional information into the message DB 6, the control unit 8 of the server device 3 sends an incoming message notification to the mobile phone of the peer that is the recipient of the short message, as described with the flowchart of FIG. 12. Upon receiving a send request issued from the mobile phone in response to this incoming message notification, the server forwards the short message and additional information temporary stored in the message DB 6. Thereby, it is possible to send additional information to introduce favorite tunes, photos, etc. of the user of the mobile phone 1 to the peer with whom the user exchanged white cards and go to the next level in establishing a confidential relationship.

[Displaying a Short Message]

Figure 15:
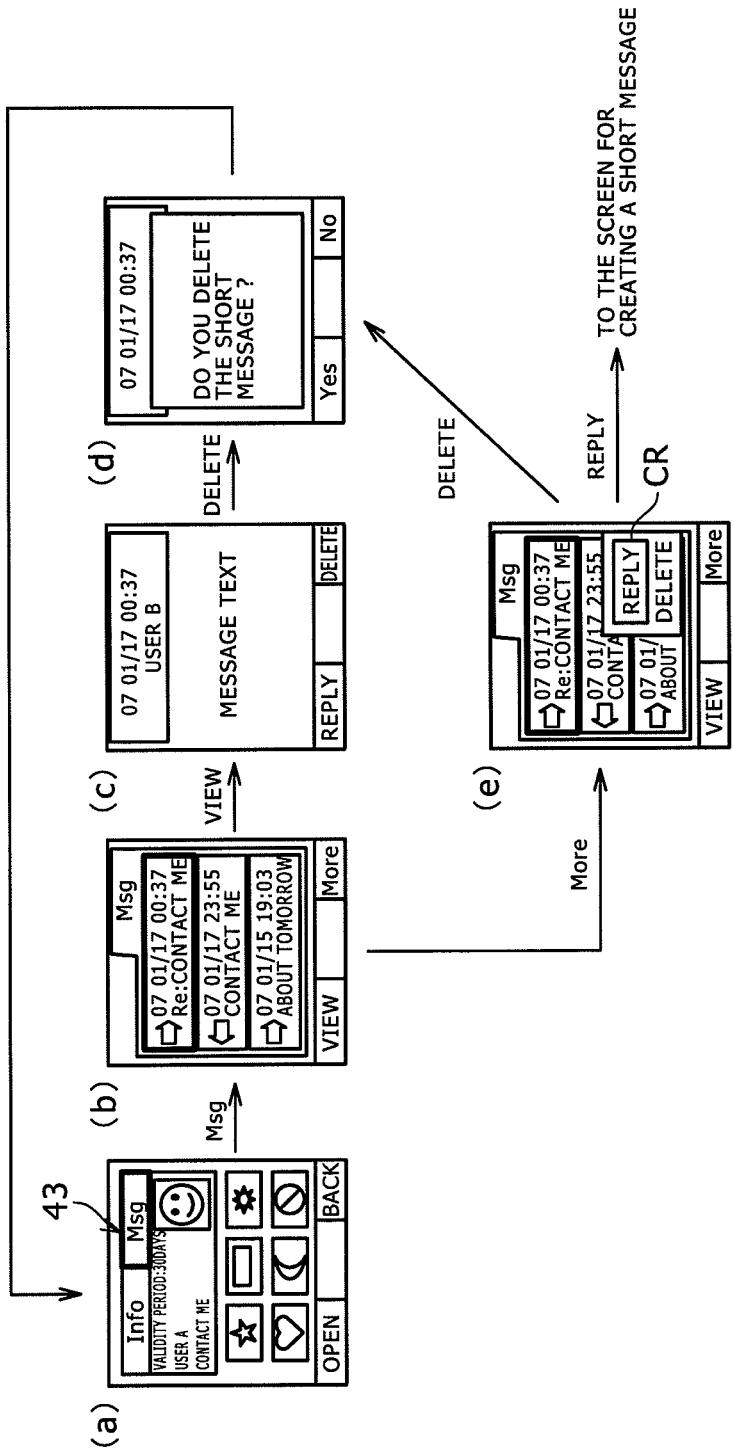
FIG. 15 illustrates a flow of displaying a short message on a mobile phone in the system for exchanging personal information of the exemplary embodiment.

FIG. 15(*a*) to FIG. 15(*e*) illustrates a flow of displaying a received short message. At a display screen in which white cards received from peers are displayed in a list, as shown in FIG. 11(*a*), first, when the user selects a desired white card by moving the cursor CR to the white card and brings up details of the selected white card, the control unit 24 displays the details on the white card selected by the user accompanied with a message tag 43, as shown in FIG. 15(*a*), on the display unit 13. FIG. 15(*a*) gives an example where additional information such as the peer's favorite photos and a jacket photo relevant to a favorite tune appears together with the peer's white card information. If exchanging additional information has not been performed, only the white card information appears.

Then, the user chooses the message tag 43 and brings up details. When the details are brought up, the control unit 24 displays a list of the titles and time stamps of short messages sent and received to/from the peer having the white card, as shown in FIG. 15(*b*), on the display unit 13.

When the user selects and brings up a desired short message from the above short message list, control unit 24 displays the text of the short message, as shown in FIG. 15(*c*), on the display unit 13. Thereby, the user can check the contents (text) of the short message. If the user of the mobile phone 1 wants to reply to the short message, the text of which was read, the user chooses the reply through the operating unit 14. When the reply is chosen, the control unit 24 displays the screen for creating a short message, as shown in FIG. 11(*c*), on the display unit 13, wherein, the user name and user ID of the peer to which the reply should be sent are attached to the short message (however, th user ID is hidden as noted above). If the user decides that the short message is unnecessary by reading its text, the user chooses the deletion through the operating unit 14. When the deletion is chosen, the control unit 24 displays a confirmation message asking if the user deletes the short message, e.g., "Do you delete the short message?", as shown in FIG. 15(*d*), on the display unit 13. When the user accepts the deletion, the control unit 24 deletes the short message from the memory 23.

On the other hand, at the display screen of a list of short messages sent and received as shown in FIG. 15(*b*), when the user chooses the menu for further processing, the control unit 24 displays a "reply" menu and a "delete" menu, as shown in FIG. 15(*e*), on the display unit 13. When the user chooses the "reply" menu, the control unit 24 displays the screen for creating a short message, as shown in FIG. 11(*c*), on the display unit 13, wherein, the user name and user ID of the peer to which the reply should be sent are attached to the short message. When the user chooses the "delete" menu, the control unit 24 deletes the short message selected by the user of the mobile phone 1 from the memory 23, as described with FIG. 15(*d*).

[Deleting a White Card Based on the Validity Period of the Card]

If a long time has passed after exchanging white cards with a peer without contacting with the peer, the peer's white card information usually becomes unnecessary. Such unnecessary white card information, if it continues to reside in the memory 23, unreasonably shrinks the available storage space of the memory 23. In the system for exchanging personal information of the present embodiment, a suitable validity period can be attached to a white card. On a mobile phone, white card information whose validity period has expired is deleted from the memory 23. Thus, an inconvenience that the available storage space of the memory 23 is shrunk by unnecessary white card information is avoided.

Figure 16:
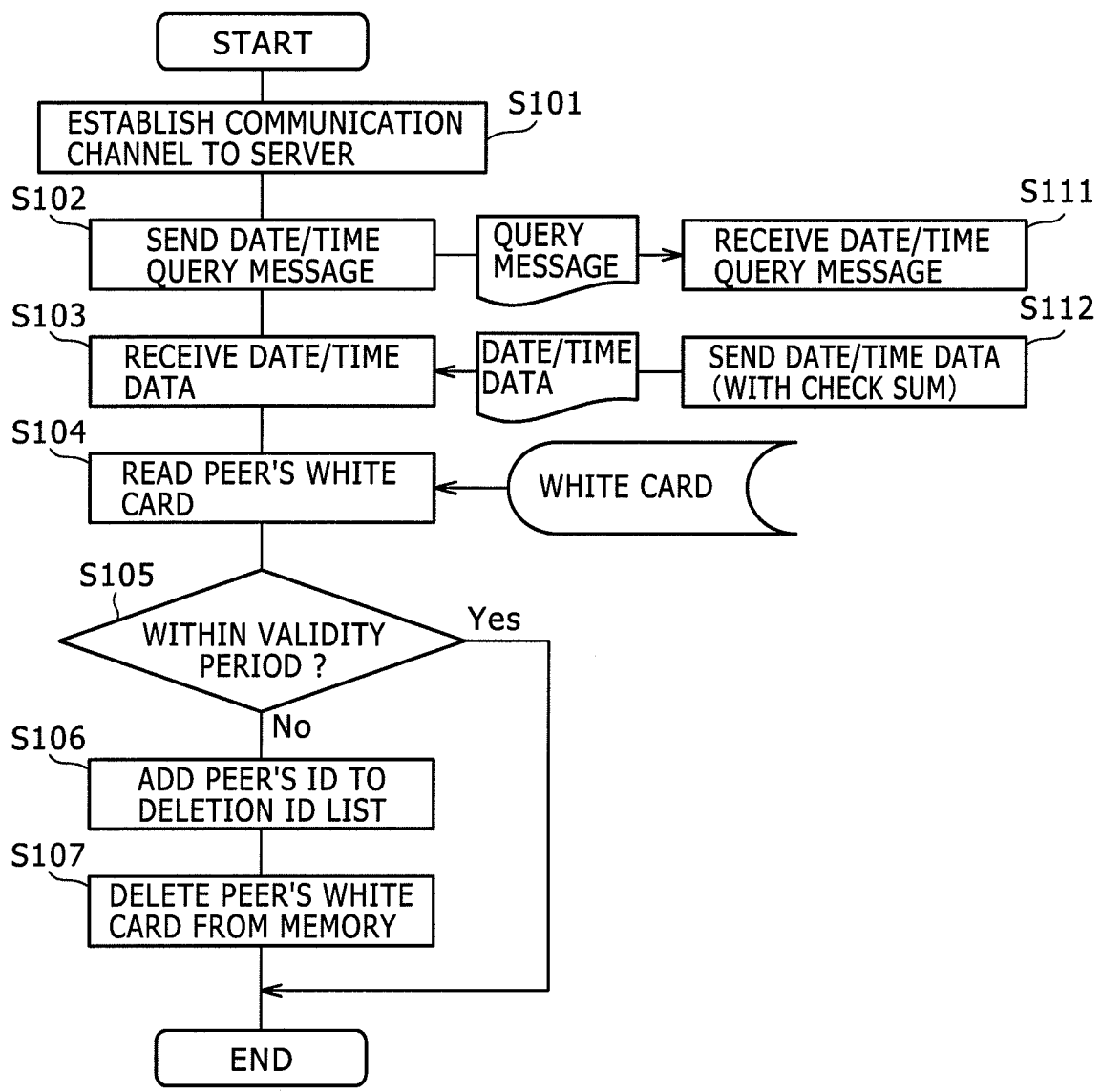
FIG. 16 is a flowchart illustrating a process of automatically deleting unnecessary white cards which have been expired on a mobile phone in the system for exchanging personal information of the exemplary embodiment.

A flowchart of FIG. 16 illustrates a process flow of deleting white card information based on its validity period. In the flowchart of FIG. 16, steps S101 to S107 represent the process that is performed by the control unit 24 of the mobile phone 1 and steps S111 and S112 represent the process that is performed by the control unit 8 of the server device 3. Although the following description assumes that a valid period is attached to a white card, a validity period may be attached to a pink card and a short message. In each case, the relevant information is deleted from the memory 23 upon the expiry of the validity period. For detail, refer to the following description.

Based on the personal information exchanging program stored on the memory 23, at step S101 in the flowchart of FIG. 16, first, the control unit 24 of the mobile phone 1 controls the communication circuit 2 to establish a communication channel to the server device 3 at predetermined intervals or when a request to establish a communication channel is issued by the user and proceeds to step S102. At step S102, the control unit 24 sends a date/time query message to the server device 3 through the established communication channel. The control unit 8 of the server device 3 receives the date/time query message at step S111 and sends back date/time data with a check sum indicating the present date/time at step S112, then terminates the entire process illustrated in the flowchart of FIG. 16.

The control unit 24 of the mobile phone 1 receives the date/time data sent back from the server device 3 at step S103 and reads the validity period of a peer's white card in the memory 23 at step S104. Then, at step S105, the control unit 24 compares the validity period of the peer's white card with the date/time data received from the server device 3. If the control unit 24 judges that the present date/time designated by the date/time data is within the validity period of the white card, it terminates the entire process illustrated in the flowchart of FIG. 16. If the control unit 24 judges that the present date/time designated by the date/time data is beyond the validity period of the white card, it proceeds to step S106.

At step S106, as the validity period of the white card has expired, the control unit 24 adds the user ID transparently attached to the expired white card (the hidden user ID hidden attached to the white card) to a deletion ID list in the memory 23 and proceeds to step S107. At the step S107, the control unit 24 deletes the expired white card from the memory 23 and terminates the entire process illustrated in the flowchart of FIG. 16. The control unit 24 executes the above-described process for all white cards stored in the memory 23 to delete every expired white card from the memory 23.

Thereby, it is possible to avoid an inconvenience that the available storage space of the memory 23 is shrunk by unnecessary white cards which have been accumulated in the memory without being used in contacting a peer for a long time after exchanging white cards. An effective use of the storage space of the memory 23 can be achieved.

Advantageous Effects of Embodiments

As is obvious from the description provided hereinbefore, the system for exchanging personal information of the present embodiment is arranged such that white cards containing simple personal information are exchanged between mobile phones 1, 2 through their short range wireless communications units. The control unit 24 of the mobile phone 1 automatically groups white cards of peers received for a predetermined period of time and displays a group of white cards on the display unit 13. Thereby, the user of the mobile phone 1 can recognize peers with whom the user exchanged white cards on a group basis. Hence, this advantageously helps the user to identify each peer with whom the user exchanged white cards and to recall or even identify when and where the user exchanged white cards.

A validity period is attached to a white card (and a short message or a pink card) and a white card whose validity period has expired is automatically deleted from the memory 23. Consequently, it is possible to avoid an inconvenience that the available storage space of the memory 23 is shrunk by unnecessary white cards accumulated in the memory without being used in contacting a peer for a long time after exchanging white cards. An effective use of the storage space of the memory 23 can be achieved.

Finally, while personal information is exchanged using mobile phones in the above-described embodiments, personal information may be exchanged using other mobile devices such as personal handyphone systems (PHS), personal digital assistants (PDA), handheld gaming devices, and notebook personal computers. In each case, the same advantages as described above can be obtained.

The above-described embodiments are to be considered as examples of the present invention. Therefore, it will be appreciated that the present invention is not limited to the described embodiments; rather, the invention may be modified in various forms depending on design and other requirements without depending the scope of the technical idea of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal device comprising:
    a short range wireless communications unit performing short range wireless communications;
    a personal information storage unit adapted to store a set of simple personal information relevant to the user of the mobile terminal device and a set of contact information for the user attached to the set of simple personal information and inhibited from being displayed on a device receiving this information;
    a sending and receiving control module controlling said short range wireless communications unit to send the set of simple personal information and the set of contact information stored in said personal information storage unit to a peer device with which the mobile terminal device is in communication to exchange personal information and controlling said short range wireless communications unit to receive a set of simple personal information and a set of contact information relevant to and provided by a peer user;

a timer to count time;

a control unit to associate a receipt time counted by the timer with the received set of simple personal information;

a personal information exchanging unit to set a predetermined time interval;

an automatically grouping and registering module grouping and registering respective sets of simple personal information and respective sets of contact information received from respective peer users with whom the user exchanged personal information, the grouping and registering based on the simple personal information having a receipt time within the predetermined period of time through the short range wireless communications unit, into a storage unit; and a display control module displaying, from among the sets of simple personal information and the sets of contact information for peer users in a group registered in the storage unit by the automatically grouping and registering module, only the sets of simple personal information on a display unit, wherein the control unit automatically assigns the same group identifier to all respective users with whom the user exchanged simple personal information having a receipt time within the predetermined period of time, wherein the control unit extracts face photographs from the respective simple personal information and arranges the extracted face photographs of the respective users with whom the user has exchanged the respective simple personal information for the predetermined time and a face photograph of the user into a group identifiable by the group identifier, and wherein displaying only the sets of simple personal information further comprises displaying the group of face photographs identifiable by the group identifier.

2. The mobile terminal device according to claim 1, wherein:

the personal information storage unit is further adapted to store a set of detailed personal information for the user together with the set of simple personal information and the set of contact information; and the mobile terminal device further comprises, a wireless communications unit performing wireless communications via a wireless base station, and a communication control module that, when a desired set of simple personal information for a peer user is selected from among the sets of simple personal information for peer users in the group displayed on the display unit and a request is made to send the set of the user's detailed personal information, controls the wireless communications unit to send the set of detailed personal information stored in the personal information storage unit to a recipient contact designated by the contact information attached to the selected set of simple personal information for a peer user.

3. The mobile terminal device according to claim 2, wherein:

the set of contact information for the user of the mobile terminal device stored in the personal information storage unit and the set of contact information for a peer user each include a user identifier assigned to each user from a server device on a certain network, URL (Uniform Resource Locator) of the server device, and an e-mail address registered associated with the user identifier in a database on the server device; and the communication control module, when sending the set of detailed personal information to a peer user through the wireless communications unit, accesses the server device based on the URL and sends the user identifier of the peer user, the user identifier of the user of the mobile terminal device, and the set of detailed personal information to the server device, thereupon, the sever device, after completing user authentication based on the user identifiers of each user, retrieves the e-mail address of the peer user from the database based on the user identifier of the peer user, and forwards the set of detailed personal information to the e-mail address.

4. The mobile terminal device according to claim 1, wherein:

a validity period within which simple personal information is allowed to be displayed is attached to at least the respective sets of simple personal information for peer users; and the mobile terminal device further comprises, a timer counting the present time, and an erasure control module controlling the storage unit to erase a set of simple personal information whose validity period has been exceeded beyond the present time counted by the timer unit.

5. A method for exchanging personal information between mobile terminal devices, comprising the steps of:

controlling a short range wireless communications means so that, from a personal information storage means in which a set of simple personal information relevant to the user of a mobile terminal device and a set of contact information for the user attached to the set of simple personal information and inhibited from being displayed on a device receiving this information, the communications means sends the set of simple personal information and the set of contact information to a peer device with which the mobile terminal device is in communication to exchange personal information and receives a set of simple personal information and a set of contact information relevant to and provided by a peer user;

counting a present time;

associating a receipt time counted at a present time with the received set of simple personal information;

setting a predetermined time interval;

grouping and registering respective sets of simple personal information and respective sets of contact information received from respective peer users with whom the user exchanged personal information, the grouping and registering based on the simple personal information having a receipt time within the predetermined period of time through the short range wireless communications unit, into a storage unit; and displaying, from among the sets of simple personal information and the sets of contact information for peer users in a group registered in the storage means, only the sets of simple personal information on a display means, wherein steps further comprises automatically assigning the same group identifier to all respective users with whom the user exchanged simple personal information having a receipt time within the predetermined period of time, wherein the steps further comprises extracting face photographs from the respective simple personal information and arranging the extracted face photographs of the respective users with whom the user has exchanged the respective simple personal information for the predetermined time and a face photograph of the user into a group identifiable by the group identifier, and wherein displaying only the sets of simple personal information further comprises displaying the group of face photographs identifiable by the group identifier.

6. A system for personal information exchange between mobile terminal devices, comprising:

mobile terminal devices; and a server device, each mobile terminal device including, a short range wireless communications unit performing short range wireless communications, a wireless communications unit performing wireless communications via a wireless base station, a personal information storage unit adapted to store a set of simple personal information relevant to the user of the mobile terminal device, a set of contact information for the user including a user identifier assigned to each user from a server device on a certain network, URL (Uniform Resource Locator) of the server device, and an e-mail address registered associated with the user identifier in a database on the server device, wherein the set of contact information is attached to the set of simple personal information and inhibited from being displayed on a device receiving this information, and a set of detailed personal information for the user, a sending and receiving control module controlling the short range wireless communications unit to send the set of simple personal information and the set of contact information stored in the personal information storage unit at the time of exchanging personal information and controlling the short range wireless communications unit to receive a set of simple personal information and a set of contact information relevant to and provided by a peer user, a timer to count time;

a control unit to associate a receipt time counted by the timer with the received set of simple personal information;

a personal information exchanging unit to set a predetermined time interval;

an automatically grouping and registering module grouping and registering respective sets of simple personal information and respective sets of contact information received from respective peer users with whom the user exchanged personal information, the grouping and registering based on the simple personal information having a receipt time within the predetermined period of time through the short range wireless communications unit, into a storage unit, wherein the control unit automatically assigns the same group identifier to all respective users with whom the user exchanged simple personal information having a receipt time within the predetermined period of time;

a display control module displaying, from among the sets of simple personal information and the sets of contact information for peer users in a group registered in the storage unit by the automatically grouping and registering module, only the sets of simple personal information on a display unit, wherein the control unit extracts face photographs from the respective simple personal information and arranges the extracted face photographs of the respective users with whom the user has exchanged the respective simple personal information for the predetermined time and a face photograph of the user into a group identifiable by the group identifier, wherein displaying only the sets of simple personal information further comprises displaying the group of face photographs identifiable by the group identifier, and a communication control module that, when a desired set of simple personal information for a peer user is selected from among the sets of simple personal information for peer users in a group displayed on the display unit and a request is made to send the set of the user's detailed personal information, controls the wireless communications unit to access the server device based on the URL from the set of contact information attached to the selected set of simple personal information and send the user identifier of the peer user, the user identifier of the user of the mobile terminal device, and the set of detailed personal information to the server device;

the server device including, a user identifier issuance unit that issues and delivers a user identifier to a mobile terminal device, a database adapted to store the e-mail address of each user associated with each user identifier issued by the user identifier issuance unit, a user authentication unit that, upon receiving the user identifier of the peer user, the user identifier of the user of the mobile terminal device, and the set of detailed personal information from the mobile terminal device, performs user authentication based on the user identifier of the user of the mobile terminal device by referring to the database, and a forwarding unit that, when the user of the mobile terminal user has been authenticated as a valid user by the user authentication unit, retrieves the e-mail address of the peer user from the database based on the user identifier of the peer user, and forwards the set of detailed personal information for the user of the mobile terminal device to the e-mail address.

\* \* \* \* \*